US008782418B2

United States Patent

Poitier et al.

(10) Patent No.: US 8,782,418 B2
(45) Date of Patent: Jul. 15, 2014

(54) ENTERTAINMENT DEVICE

(75) Inventors: Emmanuel James Poitier, London (GB); Richard Eliot Bates, London (GB)

(73) Assignee: Sony Computer Entertainment Europe Limited (GB)

( * ) Notice: Subject to any disclaimer, the term of this patent is extended or adjusted under 35 U.S.C. 154(b) by 878 days.

(21) Appl. No.: 12/446,898

(22) PCT Filed: Nov. 13, 2007

(86) PCT No.: PCT/GB2007/004330
§ 371 (c)(1),
(2), (4) Date: Dec. 15, 2009

(87) PCT Pub. No.: WO2008/059230
PCT Pub. Date: May 22, 2008

(65) Prior Publication Data
US 2010/0146283 A1 Jun. 10, 2010

(30) Foreign Application Priority Data

Nov. 13, 2006 (GB) .................................. 0622613.8
Apr. 5, 2007 (GB) .................................. 0706767.1

(51) Int. Cl.
*H04L 29/06* (2006.01)
*G06F 21/00* (2013.01)
*H04L 12/22* (2006.01)
*H04L 9/12* (2006.01)

(52) U.S. Cl.
CPC ................ *G06F 21/00* (2013.01); *H04L 12/22* (2013.01); *H04L 9/12* (2013.01)

USPC ........... 713/176; 713/180; 713/182; 713/183; 713/184; 713/185; 713/186; 713/189; 726/1; 726/2; 726/3; 726/4; 726/27; 726/28; 726/29; 726/30

(58) Field of Classification Search
CPC ........................................ G06F 21/00
USPC .............. 713/182–186, 176; 726/1–4, 26–30
See application file for complete search history.

(56) References Cited

U.S. PATENT DOCUMENTS 5,694,471 A * 12/1997 Chen et al. ..................... 705/76
6,810,200 B1 10/2004 Aoyama et al.

(Continued)

FOREIGN PATENT DOCUMENTS

EP 0715243 6/1996
EP 0813133 A2 12/1997

(Continued)

OTHER PUBLICATIONS

K. Ganesan et. al., "Look-up Table Based Chaotic Encryption of Audio Files", 2006, IEEE.*

(Continued)

*Primary Examiner* — Taghi Arani
*Assistant Examiner* — Josnel Jeudy
(74) *Attorney, Agent, or Firm* — Lerner, David, Littenberg, Krumholz & Mentlik, LLP

(57) ABSTRACT

An entertainment device comprises communication means operable to receive media data from a media data source, storage means operable to store the received media data, in which the storage means limits the duration of access to the media data which was received from the media data source.

18 Claims, 18 Drawing Sheets

(56) References Cited

U.S. PATENT DOCUMENTS

| | | | |
|---|---|---|---|
| 7,549,172 B2* | 6/2009 | Tokutani et al. | 726/27 |
| 2002/0049679 A1 | 4/2002 | Russell et al. | |
| 2002/0160749 A1 | 10/2002 | Nishikawa | |
| 2003/0123667 A1* | 7/2003 | Weber et al. | 380/277 |
| 2003/0167296 A1* | 9/2003 | Todd, II | 709/203 |
| 2003/0185397 A1* | 10/2003 | Ishiguro | 380/277 |
| 2003/0221107 A1 | 11/2003 | Kang | |
| 2004/0069122 A1 | 4/2004 | Wilson | |
| 2004/0215909 A1* | 10/2004 | Imai et al. | 711/163 |
| 2005/0102237 A1 | 5/2005 | Wakimoto | |
| 2005/0171913 A1 | 8/2005 | Kurihara et al. | |
| 2006/0143129 A1 | 6/2006 | Holm et al. | |
| 2007/0043766 A1* | 2/2007 | Nicholas et al. | 707/104.1 |

FOREIGN PATENT DOCUMENTS

| | | |
|---|---|---|
| EP | 1712978 A2 | 12/2006 |
| EP | 1826695 A2 | 8/2007 |
| GB | 2354347 A | 3/2001 |
| GB | 2370136 A | 6/2002 |
| WO | 03005148 | 1/2003 |
| WO | 03096585 | 11/2003 |
| WO | 2005057846 | 6/2005 |

OTHER PUBLICATIONS

International Search Report and Written Opinion dated May 7, 2008 from the corresponding PCT/GB2007/004330.

UK Search Report under Sections 17(5) dated Aug. 8, 2007 from the corresponding UK Application No. GB0706767.1.

UK Search Report under Sections 17(6) dated Jan. 11, 2008 from the corresponding UK Application No. GB0706767.1.

OMA: "DRM Architecture Approved Version 2.0—Mar. 3, 2006 Open Mobile Alliance OMA-AD-DRM-V2 0-20060303-A" Internet Citation, [Online] Mar. 3, 2006, XP002439607 Retrieved from the Internet: URL: http://www.openmobilealliance.org/release_program/docs/DRM/V2_0-20060303-A/OMA-AD-DRM-V2_0_20060303-A.pdf> [retrieved on Jun. 27, 2007] Section 4 and 5.

Microsoft Corporation: "A Technical Overview of Windows Media DRM 10 for Devices passage" Technical Overview of Windows Media DRM 10 for Devices, Microsoft,, US, Sep. 2004, pp. 1-15, XP002371223; section d, f, g.

OMA: "DRM Rights Expression Language V2.0—OMA-DRM-REL-V2_0-20041210-C" OMA Specification, [Online] Dec. 10, 2004, XP002476791 Retrieved from the Internet: URL: http://member.openmobilealliance.org/ftp/Public_documents/DRM/Permanent_documents/OMA-DRM-REL-V2_0-20041210-C.zip> [retrieved on Apr. 16, 2008] Section 5.

* cited by examiner

ENTERTAINMENT DEVICE

The present invention relates to entertainment devices.

With the proliferation of the internet and the increase in music, video and games downloads and the possible copyright infringement issues that may arise from such downloads, digital rights management schemes have become ever more important. The purpose of such schemes is to try and ensure that only an authorised user or someone who has paid for that download is allowed to access the downloaded content. For example, the downloaded content might be locked so that it can only be accessed using the device that was to used to download it.

However, in the field of games entertainment devices, if an owner of a game wishes to visit a friend and experience some aspect of that game on their friend's entertainment device, the owner may be unable to do so if the game content is locked to their own entertainment device.

Such a situation may arise, for example, with a karaoke game such as SingStar® published by Sony Computer Entertainment Europe for the PlayStation 3® entertainment device. Here, although several friends may own a version of the karaoke game, not all of them may own a copy of all of the songs that may be performed within the game. Therefore, if a purchaser of a song wishes to visit a friend and perform a song that the friend does not own on the friends entertainment device, the user will be unable to do so if the song content is locked solely to the purchase's entertainment device.

The present invention seeks to alleviate or mitigate the above problems.

In a first aspect, there is provided an entertainment device, comprising:
communication means operable to receive media data from a media data source;
storage means operable to store the received media data; and in which:
the communication means is operable to receive, from a signature data source, signature data that relates to usage rights of the media data; and
the storage means is operable to limit the duration of access to the media data which was received from the media data source in dependence upon the signature data received from the signature data source.

In a second aspect, there is provided a method of data storage by an entertainment device, comprising the steps of:
establishing a communication link with a media data source;
receiving media data from the media data source;
receiving, from a signature data source, signature data that relates to usage rights of the media data;
storing received media data; and
limiting the duration of access to the media data which was received from the media data source in dependence upon the signature data received from the signature data source.

Advantageously, the above aspects therefore mitigate the issue of copyright infringement by, for example, providing a time-limited duration of access to the media data and thereby preventing the acquisition of a permanent but unauthorised copy of any media data. Furthermore, if, for example, a user has purchased the media data and downloaded it to their entertainment device, the duration of access to that media data could be unlimited as they have legitimately purchased an authorised copy.

Further respective aspects and features of the invention are defined in the appended claims.

Advantageously, the above aspects and embodiments of the present invention allow a user to use a copy of game content (such as a song from a karaoke game) on friends entertainment device for a limited period of time. Additionally, the use of the game content on a different entertainment device can be authorised for the limited period of time by the use of signature data that relates to the usage rights of the game content. Therefore, a user may use purchased game content on their own entertainment device without any restrictions whilst still being able to utilise that game content on another entertainment device for a limited period of time.

Embodiments of the present invention will now be described by way of example with reference to the accompanying drawings, in which.

An entertainment device and corresponding method of operation are disclosed. In the following description, a number of specific details are presented in order to provide a thorough understanding of embodiments of the present invention. It will be apparent however to a person skilled in the art that these specific details need not be employed to practise the present invention. Conversely, specific details known to the person skilled in the art are omitted for the purposes of clarity in presenting the embodiments.

Embodiments of the present invention allow a user to initiate a jamming session with a second party (a so-called collaborative jamming session) despite the parties not having all their music assets in common. A jamming session is taken to encompass the use of an interactive game which allows the user(s) to select and replay media assets such as audio clips in an order decided by the user, generally in time with the beat of a desired music output. In other words, the user(s) may "build" a piece of quasi-original music by the selection and (generally) repetition of component musical features. In the case of a collaborative jamming session, two or more users may contribute selections to a composite (shared) output work.

In addition, embodiments of the present invention restrict the storage of music assets shared for the purposes of a jamming session but not owned by a user, and also provide means to acquire playback rights for these assets if desired.

For example, the jamming session could be carried out between two users, each using their own entertainment device. Here, each user could use a Sony® PlayStation Portable® device (PSP) to participate in the jamming session although it will be appreciated that both users could use a Sony® PlayStation 3® entertainment device (PS3) to participate in the jamming session or a first user could use a PSP device and the other user could use a PS3 device to participate in the jamming session. However, a plurality of users could participate in the jamming session each using their own entertainment device, or with some users sharing an entertainment device, where each entertainment device could be either a PSP device, a PS3 device or any other suitable entertainment device.

Furthermore, embodiments of the present invention allow a user to use previously purchased game assets on their own entertainment device without restriction, whilst allowing them to visit a friend and temporarily use those game assets on the friends entertainment device. Here, the owner of the game assets might use the game assets on a PS3 device whilst the friend could also use a PS3 device. However, it will be appreciated that either user could use the game assets on a PSP device or any other suitable entertainment device.

To illustrate the overall operation of both the PlayStation 3® entertainment device and the PlayStation Portable® entertainment device, these will each will be described in turn below.

Figure 1A:
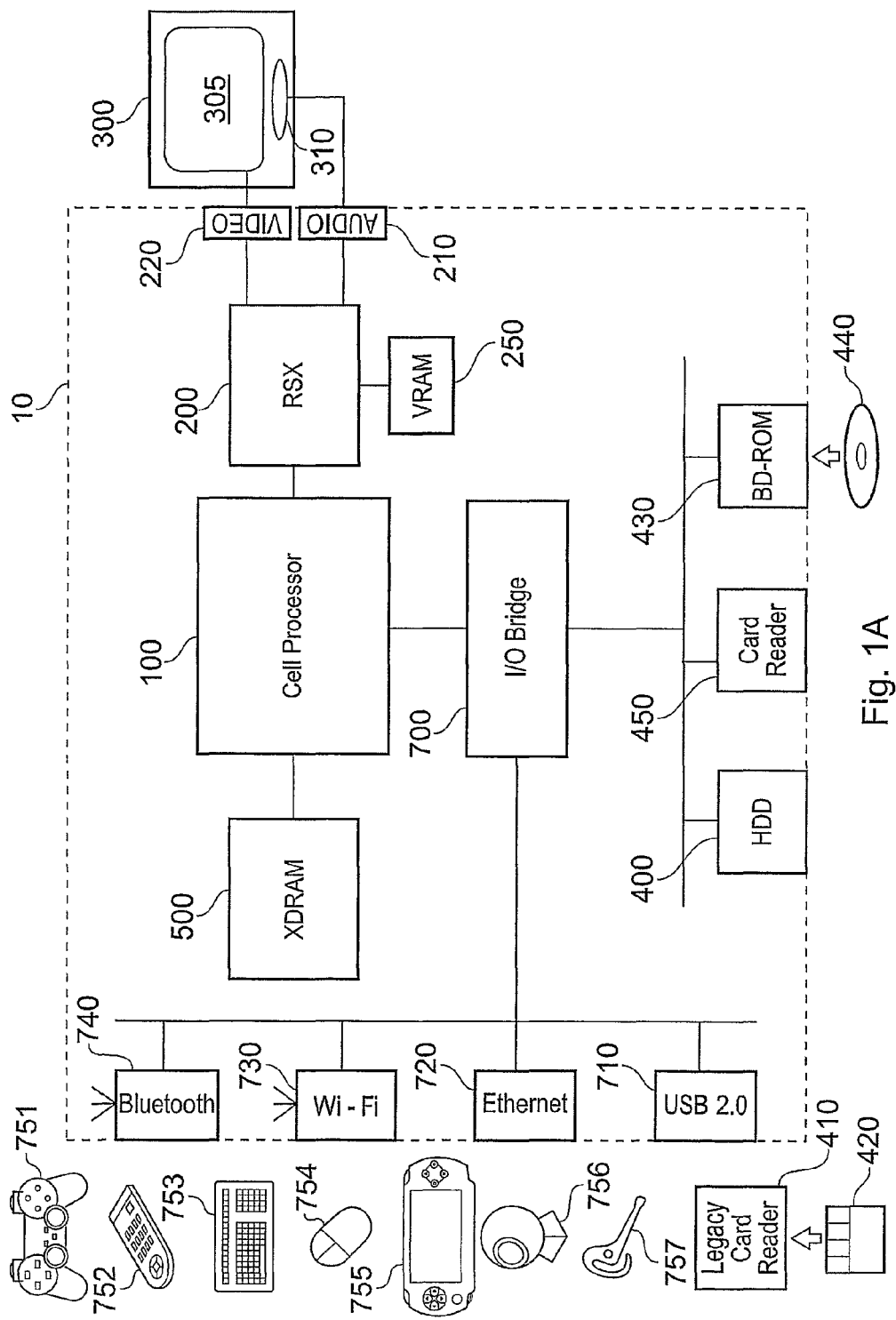
FIG. 1A is a schematic diagram of a PS3® entertainment device.

FIG. 1A schematically illustrates the overall system architecture of the Sony® PlayStation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony PlayStation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the PlayStation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the PlayStation® or PlayStation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the PlayStation Portable device may be used as a controller. In the case of the PlayStation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the PlayStation and PlayStation 2 devices, in addition to conventional pre-recorded and recordable CDs, and so-called Super Audio CDs. The reader 430 is also operable to read DVD-ROMs compatible with the PlayStation 2 and PlayStation 3 devices, in addition to conventional pre-recorded and recordable DVDs. The reader 430 is further operable to read BD-ROMs compatible with the PlayStation 3 device, as well as conventional pre-recorded and recordable Blu-Ray Disks.

The system unit 10 is operable to supply audio and video, either generated or decoded by the PlayStation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720 p, 1080 i or 1080 p high definition.

Audio processing (generation, decoding and so on) is performed by the Cell processor 100. The PlayStation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 1B:
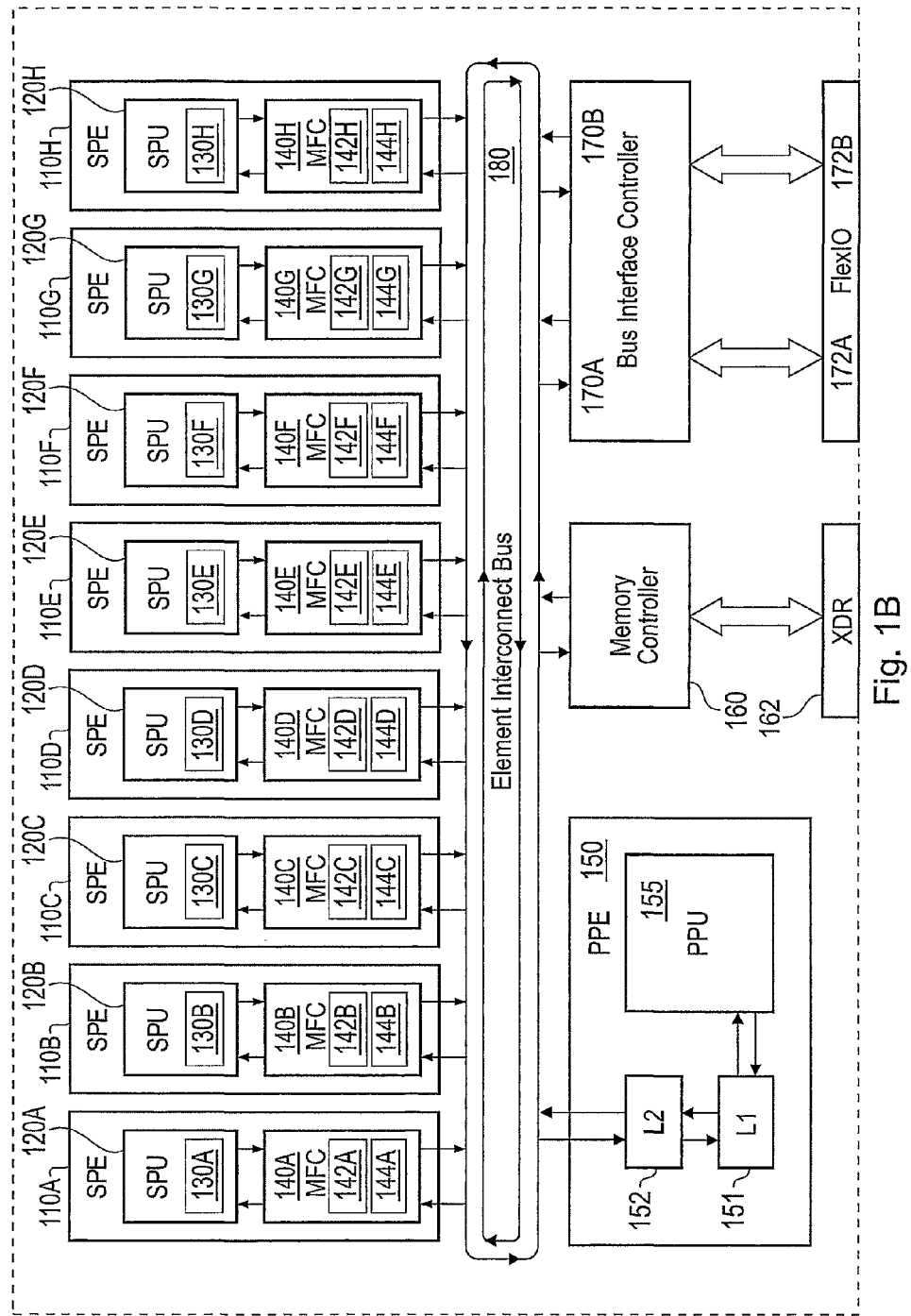
FIG. 1B is a schematic diagram of a cell processor.

Referring now to FIG. 1B, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the PlayStation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 1C:
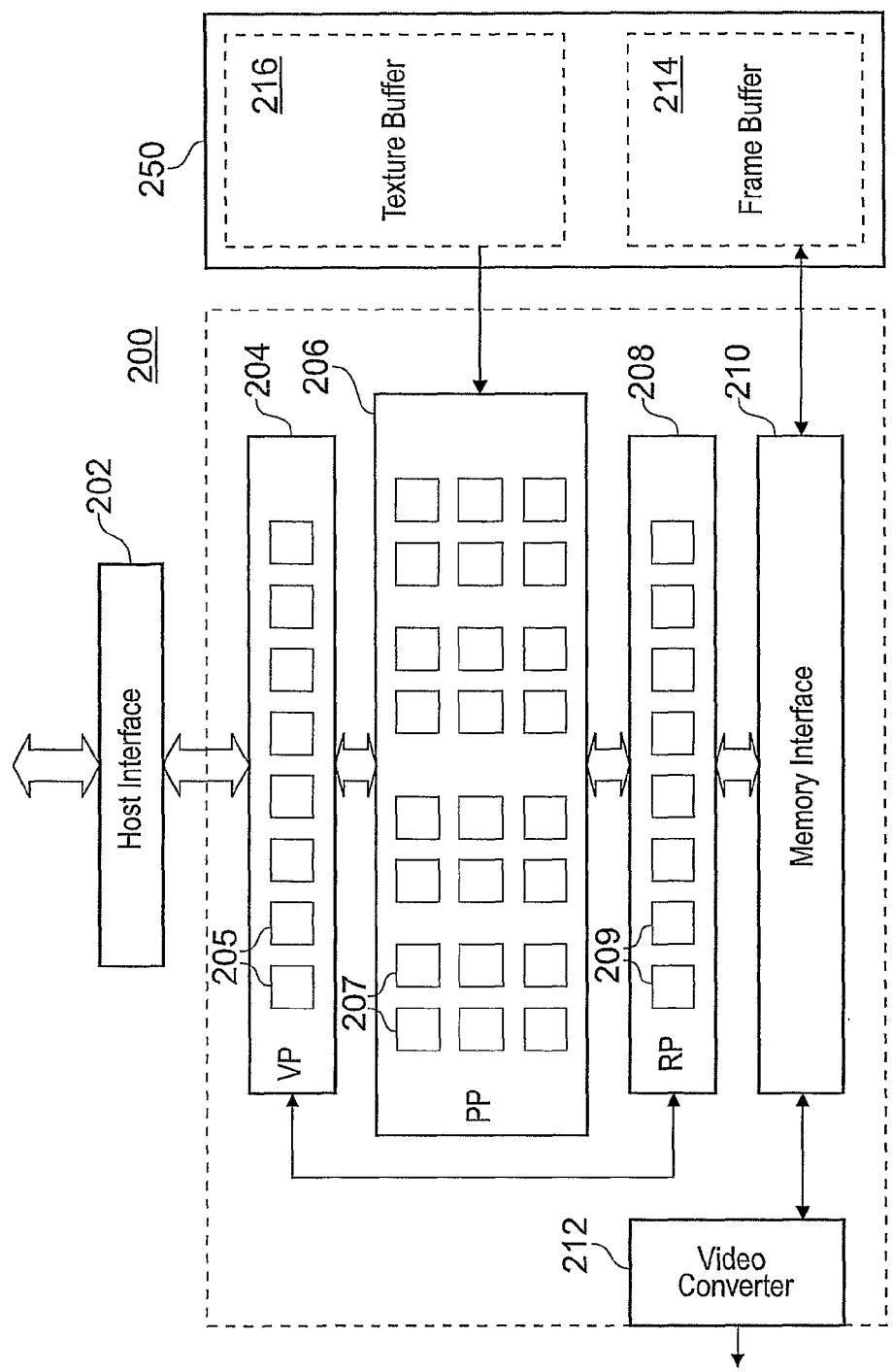
FIG. 1C is a schematic diagram of a video graphics processor.

Referring now to FIG. 1C, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error Masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the PlayStation 3 devices operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the functions horizontally using a game controller 751, remote control 752 or other suitable control device so as to highlight the desired function, at which point options pertaining to that function appear as a vertically scrollable list centred on that function, which may be navigated in analogous fashion. However, if a game, audio or movie disk 440 is inserted into the BD-ROM optical disk reader 430, the PlayStation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demos and other media may be downloaded, and a friends management capability, providing on-line communication with other PlayStation 3 device users nominated by the user of the current device; for example, by text, audio or video depending on the peripheral devices available. The on-line capability also provides for on-line communication, content download and content purchase during play of a suitably configured game, and for updating the firmware and OS of the PlayStation 3 device itself. It will be appreciated that the term "on-line" does not imply the physical presence of wires, as the term can also apply to wireless connections of various types.

As mentioned above, embodiments of the present invention may also be implemented using a PlayStation Portable® entertainment device. For example, a collaborative jamming session could take place between a user of a PS3 and a user of a PSP as described above. Additionally, for example, the media data could be played back using the PSP in accordance with the signature data associated with the media data.

Figure 2A:
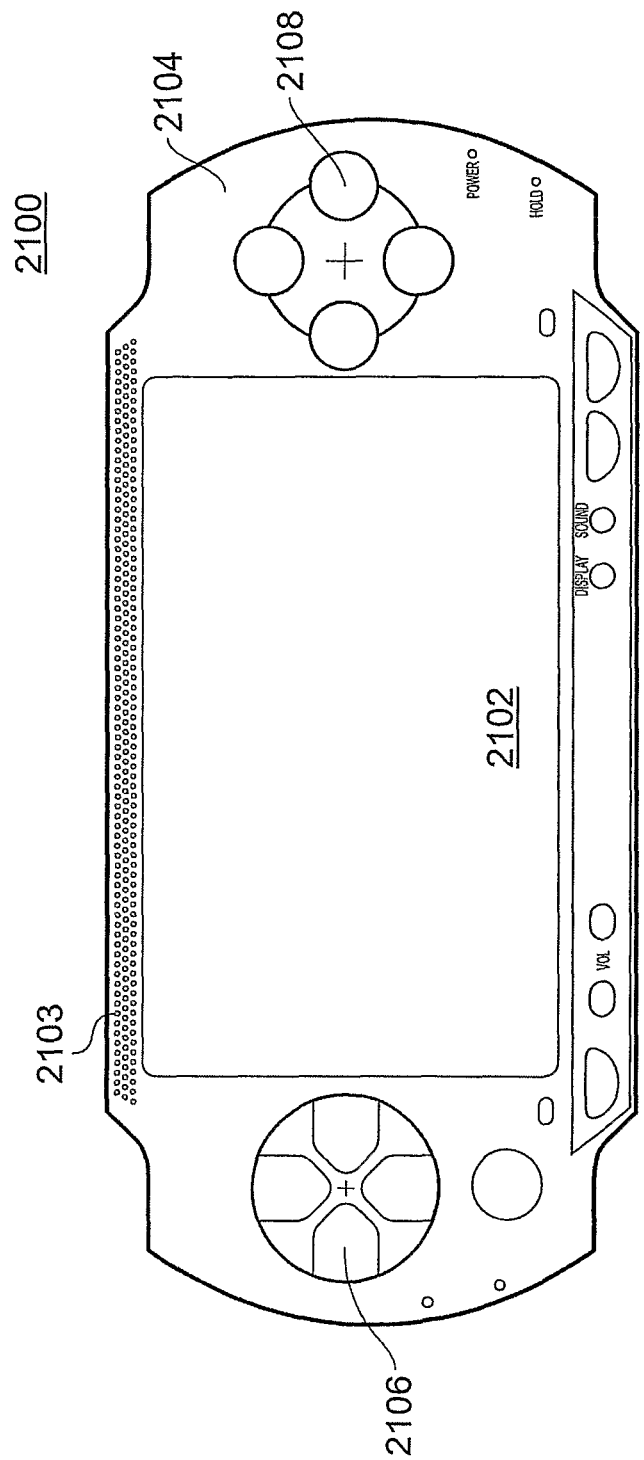
FIG. 2A is a front view of a PSP® entertainment device in accordance with an embodiment of the present invention.

Referring to FIG. 2A, in an embodiment of the present invention a Sony® PlayStation Portable® (PSP) entertainment device acts as an entertainment device 2100. The PSP body 2104 comprises, amongst other things, a left joypad 2106 and a right joypad 2108. These are used to interface with software running on the PSP. In addition, the PSP comprises an integral display 2102 and a speaker 2103.

Figure 2B:
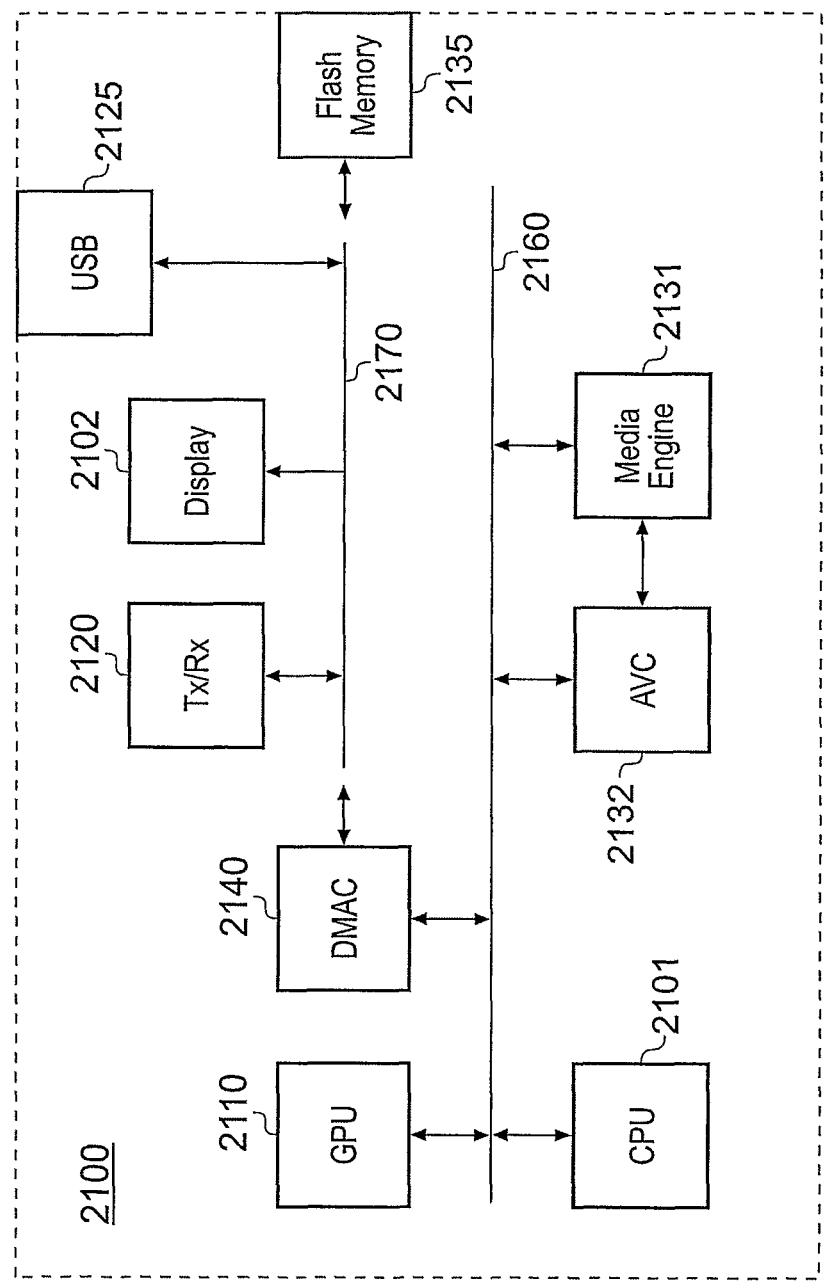
FIG. 2B is a schematic view of an entertainment device in accordance with an embodiment of the present invention.
Figure 2C:
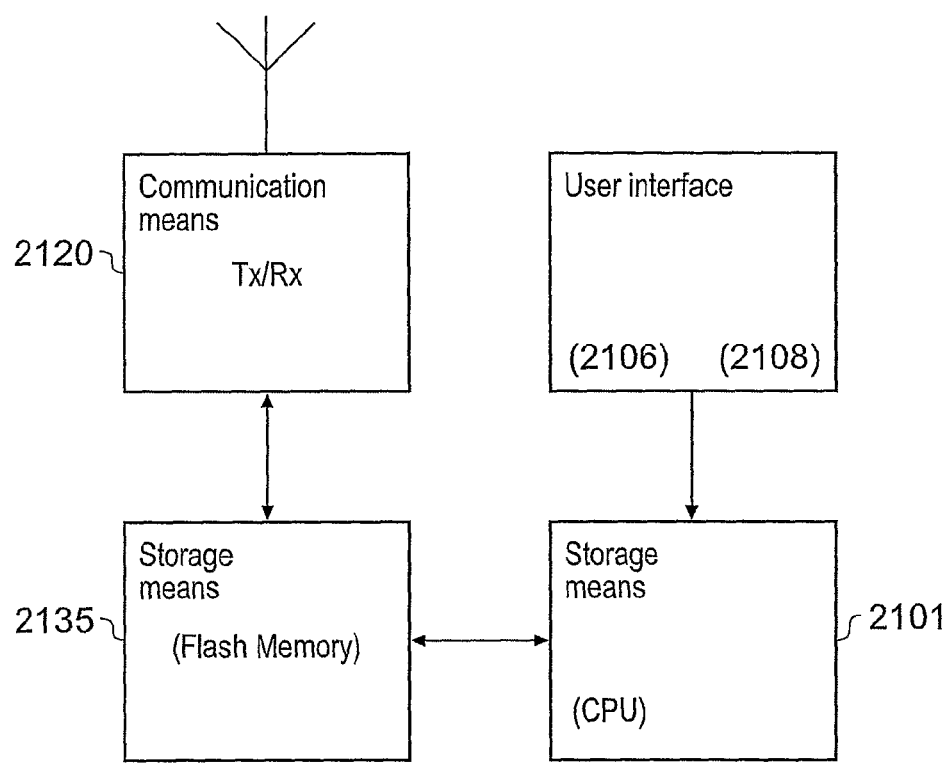
FIG. 2C is a schematic view of a functional arrangement of elements of an entertainment device in accordance with an embodiment of the present invention.

Referring now also to FIG. 2B, a summary schematic diagram of a PSP acting as the entertainment device 2100 according to an embodiment of the invention is provided. The PSP comprises a central processing unit (CPU) 2101, a graphics processing unit (GPU) 2110 for polygon rendering and the like, a media engine 2131 and an audio/video processor (AVC) 2132 for image rendering, video and audio playback and the like, and a direct memory access controller (DMAC) 2140, linked by a common bus 2160. The DMAC 2140 also links to an external bus 170 through which inputs and outputs are communicated, including with a wireless communication means (Tx/Rx) 2120, a USB connector 2125, a flash memory stick interface 2135 that can act as a storage means for the device, and to the integral display 2102. FIG. 2C shows a schematic view of a subset of these elements, identifying their roles in embodiments of the present invention. All operate under software control, e.g. from disc or network (e.g. wireless Internet connection). Steps carried out under software control cause the game to be played as described below.

An entertainment device 2100, operating under the instruction of suitable software, is operable to provide a rhythm action game with a collaborative jamming facility.

In an embodiment of the present invention, music assets (either provided with the game, bought on additional recorded media, or downloaded from an on-line store), are arranged to allow separate access to some segments of the music, such as a drum beat or a vocal track, or particular sound effects or key musical phrases.

Figure 3:
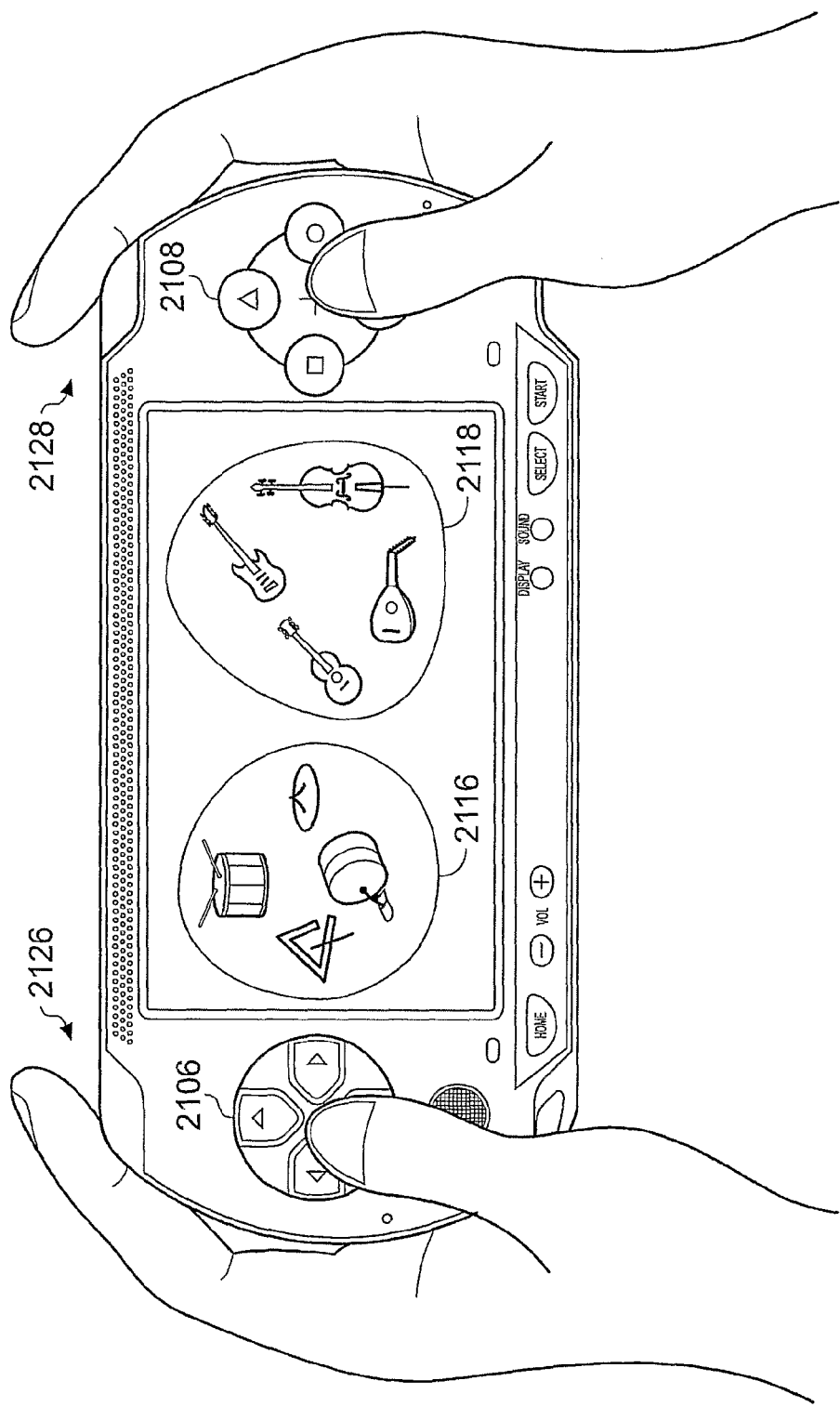
FIG. 3 is a schematic view of an entertainment device in accordance with an embodiment of the present invention.

Referring now to FIG. 3, a first entertainment device playing the rhythm action game in a solo mode thematically arranges these music segments of the available or selected music assets in groups 2116, 2118, such as for example drum beats, base lines or vocal tracks. Such a thematic arrangement may be preset or determined by user selection. Typically, two groups of four music segments are presented on-screen at any one time, thereby corresponding with the two groups of four buttons available on the joypads 2106, 2108, of the entertainment device. However, it will be clear to a person skilled in the art that the arrangement of such groups is flexible, and may depend on the nature of the user interface of the host entertainment device.

The groups can be paged through using additional buttons on the entertainment device 2126, 2128 to access all the available or selected groups of music segments.

The user can then select to play back one segment from each group, for as many of the groups as they wish. Typically the music segments play back in a continuous loop, allowing the user to build up a complex remix comprising many music segments.

Playback of a music segment by the entertainment device begins when the corresponding button on the entertainment device is pressed, allowing for variations in timing, and effects such as syncopation.

Alternatively, timing may be quantised such that pressing a button corresponding to a music segment causes that segment to begin playback at the next beat, or the next bar.

Optionally, the user may elect to only play a segment once, for example in order to punctuate a rhythm or to create a musical effect. This may be achieved for example by pressing a further control button (not shown) in conjunction with the button corresponding to the desired segment.

Likewise, optionally the user may select to queue several selected segments so that they all begin simultaneously, for example at the press of a control button (not shown).

In this manner, the user can generate a remix based on music segments taken from one or more music assets available to the game.

Whilst in the example of FIG. 3 graphical representations of instruments have been displayed, it will be appreciated that alternative representations are possible, such as a central generic icon for each group (drum, voice, etc) each surrounded by graphic representations of the corresponding keys. Alternatively or in addition, descriptive text may be used to identify the segment and/or the music source of the segment.

The thematic groups may provide alternative music segments within a common group (such as drum or cymbal as shown in FIG. 3) or more typically, where a plurality of music assets are available, the groups show alternative forms of the same type of segment (such as the guitar baselines from several different songs). In an embodiment of the present invention, only one music segment in a group can be selected at any one time. In an alternative embodiment, optionally any number of music segments can be selected, for example by toggling activation of a segment using the corresponding button.

Whatever graphical representation is used, the main feature is that the user(s) can select and order desired sound components so as to build an output piece of music.

Figure 4:
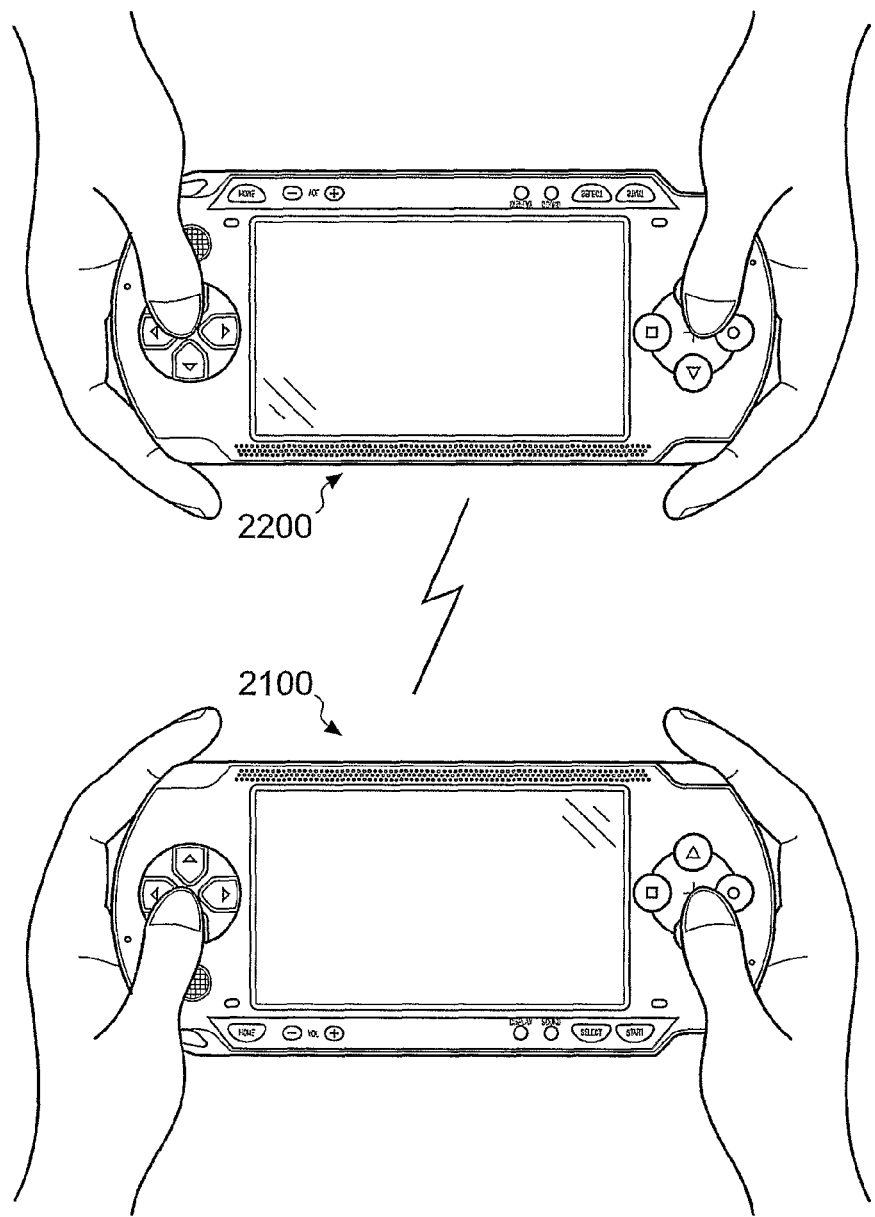
FIG. 4 is a schematic view of two entertainment devices being operated in a collaborative mode in accordance with an embodiment of the present invention.
Figure 5:
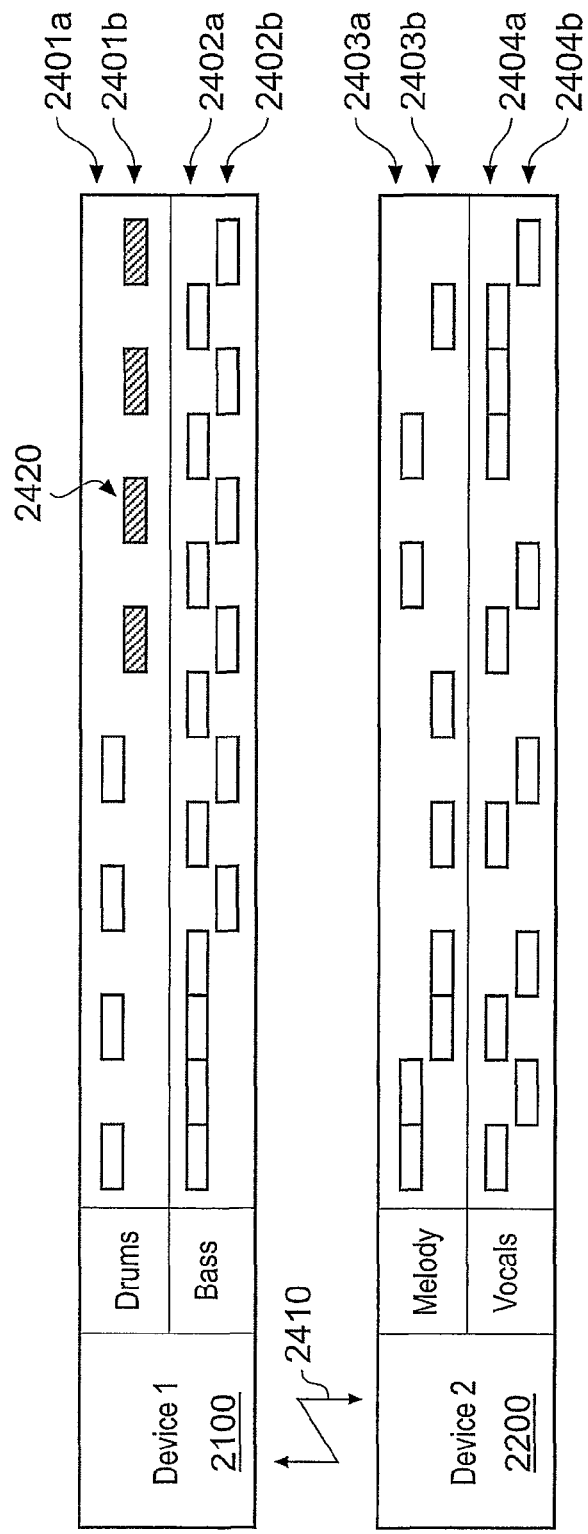
FIG. 5 is a schematic diagram of a collaborative jamming session in accordance with an embodiment of the present invention.

Referring now to FIGS. 4 and 5, a jamming session is shown in which a first user with a first entertainment device 2100 and a second user with a second entertainment device 2200 wish to collaborate. The users select which of the available groups they will respectively control. For example, the first user may elect to control bass and percussion groups whilst the second user elects to control melody and vocal groups.

The entertainment devices communicate these selections, and later on selections of audio segments during the jamming session, using an ad-hoc communication protocol between their respective wireless communication means 2120.

Typically, the wireless communication means 2120 uses a short-range wireless communication protocol such as wireless Ethernet, Bluetooth®; or IEEE (Institute of Electrical and Electronic Engineers) 802.11x.

In the case where both entertainment devices comprise the same music assets, the jamming session may then proceed with each device using its own copy of the music assets to reproduce the music segments selected by both users. Clearly a routine form of asset identification is needed to allow this to happen—perhaps a unique code associated with each such asset, and an associated time (in the output work) at which that asset should be replayed. Such codes and times can be transmitted by each user to the other user.

However, in the case where at least one of the entertainment devices has access to additional music assets over and above those of the other entertainment device, there are two options available:

Firstly, the devices can compare music assets (e.g. by using the unique codes mentioned above), and only make available to the jamming session (i.e. for use in the output work) those assets they have in common. However, this is an unsatisfactory solution for the users, as they may find that the sounds they want to use (and which are normally available to them in a non-collaborative environment) are made unavailable.

Secondly, therefore, the or each entertainment device can instead transmit to the other device music segment data corresponding to their differing music assets, so that both entertainment devices share the sum of music assets available.

For example, if the first entertainment device 2100 contains a standard set of music assets plus assets from the band 'Blur', whilst the second entertainment device 2200 contains a standard set of music assets plus assets from the band 'Oasis', the first entertainment device 2100 can transmit the 'Blur' assets to the second entertainment device 2200, whilst the second entertainment device 2200 can transmit the 'Oasis' assets to the first entertainment device 2100.

This transfer could, for example, occur as a background task whilst the users are apportioning respective music segment groups between themselves as described previously. It will be appreciated that a combination of the above approaches could be used, with some music assets shared and some excluded. Which are shared and which are excluded could be based on user choice, data size, frequency of use, genre, which other assets are shared or excluded, or other factors.

Once the music assets have been shared, the jamming session may proceed. Each user makes their music segment selections via the interface of their entertainment device as described above, to create a collaborative remix using some or all of the available music assets. In the example shown in FIG. 5, the user of the first entertainment device 2100 has used an 'Oasis' percussion asset (marked as hatched in the selection sequence of FIG. 5) that was received from the second entertainment device.

As described previously, each entertainment device transmits 401 the music segment selections generated in response to their own user's input to the other entertainment device. Consequently both entertainment devices acquire and store both their own generated music segment selection data and the received music segment selection data, and both can use these to generate an audio output based (using their own music clips and received music clips) on the sequence of selections made by both users. As a result each user can hear the result of their collaborative jamming session being generated by their own respective entertainment device.

However as a result, each device now contains a record of the collaborative jamming session that may incorporate music assets stored at a user's device but which the respective user of the devices has not legitimately purchased, such as the Oasis percussion asset stored on the first entertainment device in the example of FIG. 5. Nevertheless, such a user may wish to keep a permanent record of the jamming session.

Consequently, whilst immediate deletion of the music assets shared between entertainment devices is a solution, it is unsatisfactory to the user as the jamming session is then no longer reproducible.

Referring for the purposes of example to the first of the two entertainment devices, this first entertainment device 2100 comprises a copyright determining means (implemented by the CPU 2101 in software, for example) which is associated with the storage means 2135 and which is operable to determine which if any of the music segments actually selected during the jamming session were received from the second entertainment device 2200.

Those received music segments not actually selected during the jamming session may be immediately deleted without affecting the ability to play back the recorded jamming session on the first entertainment device.

In contrast, those received music segments that were selected during the jamming session are instead stored by the first entertainment device on the storage means 2135 for a limited period of time.

As the music segment selections used to regenerate the jamming session are only of use if the relevant music segments remain available, these music segment selections may also be stored by the entertainment device on the storage means 2135 for this same limited period of time.

In an embodiment of the present invention, the time limit extends until the ad-hoc communication between the entertainment devices is severed (either by software control or by the users parting and exceeding the communication range), thereby allowing the users to revisit, replay and potentially re-edit the jamming session for as long as they are in communication with each other, but then deleting the relevant music assets when the users separate.

Optionally, this time limit may last a further short fixed period (in the order of minutes or seconds), to provide tolerance in the event of temporary connection failure.

In another embodiment of the present invention, the received music segments and the music segment selections are stored by the first entertainment device for a predetermined period of time. This period of time is of adequate duration for the user to obtain copyright authorisation to keep (e.g. permanently) the received music segments that were used in the jamming session.

Note that during this period the first entertainment device cannot share the unauthorised assets with further parties.

The copyright determination means of the first entertainment device identifies which of the received music segments the first entertainment device does not currently have the right to keep or to reproduce. Of course, the ones for which it is determined that rights are held may be kept. This may be achieved by reference to a stored look-up table, or by reference to a rights status flag associated with each music segment.

In the case of the stored look-up table, this may be held locally on the entertainment device, or on a central server accessed via the internet.

At a later time, but within the time limit for storing the music segments, the user may decide to keep the jamming session and so initiate a connection from the first entertainment device to a copyright authorisation server via an internet connection. The copyright determination means then informs the copyright authorisation server as to which music segments require copyright authorisation. The copyright authorisation server then debits a fee from the user and grants copyright authorisation.

The fee may be deducted from a prepaid credit attributed to the user. For example, a portion of the purchase price of the game may constitute a prepaid credit made available upon on-line registration of the game. When this credit runs out, the user may be invited to pay a further credit if desired. Alternatively, the fee may be paid, or the credit renewed, by known internet payment methods.

Once copyright authorisation has been granted, the time limit for storing the received music segments and the segment selection data is revoked, and the relevant data can be kept indefinitely.

Optionally, the copyright authorisation may limit use of the received music segments to reproduction of the particular jamming session. Alternatively, the copyright authorisation may allow the user to add those segments to their own set of music assets, and potentially also share them again with another user in a fashion similar to that described herein, enabling a peer-to-peer distribution of music assets.

If copyright authorisation is not obtained before the time limit runs out, then the received music segments (and optionally the user's own and the received selection data) are deleted.

Optionally, the first entertainment device may notify the user that the time limit is approaching, for example by including a notice during a session of the rhythm action game when it is played within a threshold period prior to the expiry of the time limit.

In another embodiment of the present invention, each entertainment device comprises its own copyright authorisation server. In an example scenario, the first entertainment device has shared music segments with a second entertainment device that, as described above, has determined that it needs to acquire copyright authorisation for the received music segments. If its user initiates a request for copyright authentication, the second entertainment device requests authentication from the first entertainment device.

In this embodiment, purchase of a music asset confers within its price a limited number of licences to share segments (e.g. on a segment by segment basis) from the music asset for the purposes of collaborative jamming in the game, this licence data being stored (e.g. on a purchased disk) along with the media data. The user of the first device may therefore choose whether or not to use one of these licences to grant copyright authorisation to the second user.

If the first user's licences run out, they may optionally purchase more via a central copyright authorisation server on the internet, using known internet payment schemes.

If the user of the second entertainment device does not obtain the copyright authorisation before the time limit expires, or if the user of the first entertainment device declines to use one of their licences, then the received music segments on the second entertainment device are deleted.

It will be appreciated that an embodiment of the present invention in which the facility to obtain copyright authorisation from either the originating entertainment device or a central authorisation server will be available to an entertainment device, is also considered to be within the scope of the invention.

Alternatively or in addition for any of the above embodiments, music segments may comprise a flag identifying whether they require copyright authorisation or have instead been made available under a 'free-use' licence for the jamming game. Such free-use music assets may be stored and used within the jamming game without a time limit.

It will be appreciated that the storage of the jamming session may take the form of the required music segments and the music segment selections produced by the two users, the music segment selections providing the identifying and timing information needed to regenerate the audio output resulting from the collaborative jamming session, or alternatively or in addition it may take the form of a digital recording of the audio output as a whole, without storing the accompanying music segment selection data. In this second case, it will be clear that the above time-limit and copyright authorisation methods can also apply to a digital recording that contains music assets received from another entertainment device and for which the host entertainment device does not currently have copyright authorisation. So, the host (recipient) device may be authorised (once the collaborative jamming session is over) to replay the recording of the output work but not to access for use in another output work (or even to store) the individual clips.

Likewise, it will be apparent that the jamming session and consequently the sharing of music assets need not be limited to two participants.

It will also be appreciated by a person skilled in the art that references within this description to 'music assets', 'music segments' and 'music segment selections' refer more generally to 'audio assets', 'audio segments' and 'audio segment selections'. 'Segments' may comprise digital samples, MIDI data or other audio storage or compression formats.

It will further be appreciated by a person skilled in the art that whilst typically the two or more entertainment devices involved in a collaborative jamming session have substantially identical, this need not be the case. For example, whilst typically the devices may be two Sony®PlayStation Portable® entertainment devices, potentially a collaborative jamming session may be held between a Sony®PlayStation Portable®entertainment device and a Sony®PlayStation 2 or 3® entertainment device.

Similarly, the source of the audio segment data and the audio segment selection data may be accessed via a wireless hot-spot such as a PSP 'zone'. In this case the collaborator may operate the beats jamming game within the wireless hotspot zone in a manner analogous to that described above treating the wireless hotspot zone as equivalent to the area of wireless communication with another device described previously.

It will also be appreciated that storage means 2135 may be any suitable storage means available to the entertainment device, including on-line storage, internal recordable media or removable recordable media, and may include encryption.

Figure 6:
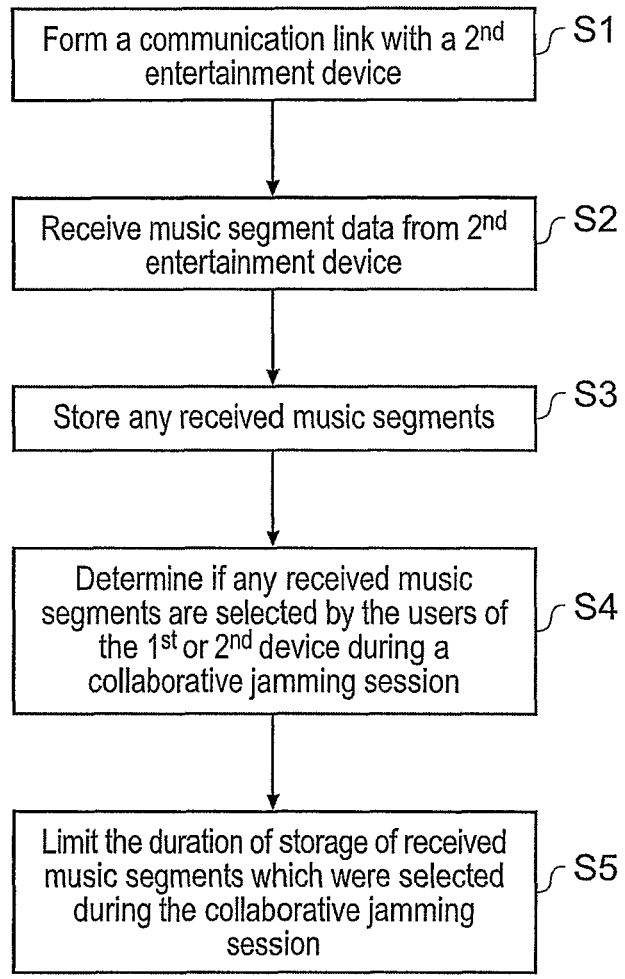
FIG. 6 is a flow diagram of a method of data storage in accordance with an embodiment of the present invention.

Referring now to FIG. 6, a method of data storage for a first entertainment device comprises the steps of:
 i. Forming a communication link with a second entertainment device (a step S1);
 ii. Receiving one or more music assets from said second entertainment device (a step S2);
 iii. Storing the received music assets (a step S3);
 iv. Determining if one or more of the received music assets are selected by users of either the first or second entertainment device during a collaborative jamming session (a step S4); and
 v. Limiting the duration of storage of audio segment data which was received from the audio segment data source and which was selected according to either the received audio segment selection data or the generated audio segment selection data (a step S5).

It will be appreciated by a person skilled in the art that variations on the above method corresponding to the operations of the variations in apparatus disclosed herein are considered to be within the scope of the present invention, including but not limited to:
 the first entertainment device transmitting music assets to the second entertainment device;
 the first entertainment device deleting unused received music assets;
 the first entertainment device storing received music assets for the duration of the communication link with the second entertainment device;
 the first entertainment device requesting copyright authorisation from a centralised authorisation server via the internet;
 the first entertainment device requesting copyright authorisation from the originating entertainment device from which the relevant music asset was received, and;
 the first entertainment device granting copyright authorisation in response to a request from a second entertainment device to which it previously transmitted a relevant music asset.

Copyright authorisation and digital rights management according to embodiments of the present invention will now be described in more detail.

Figure 7:
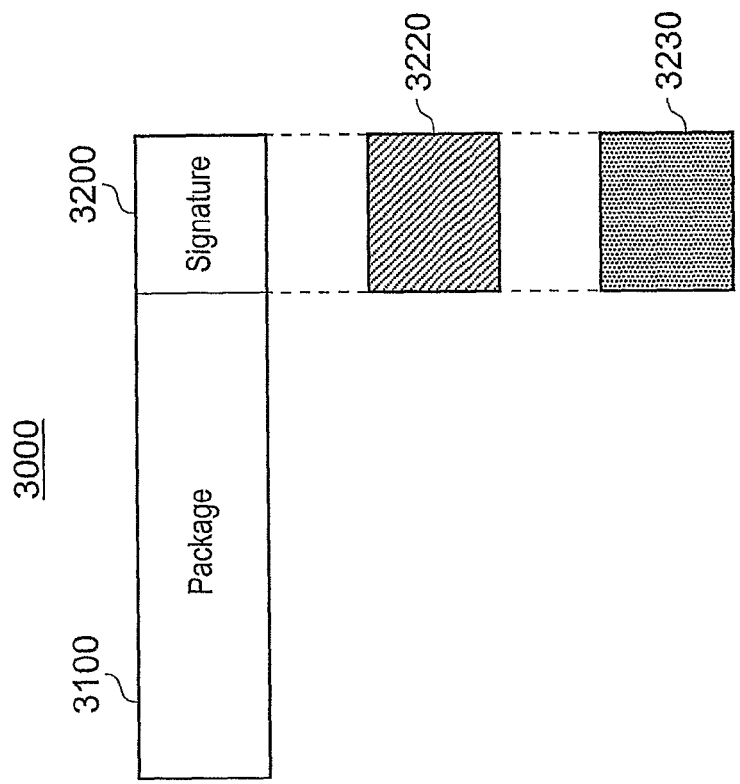
FIG. 7 is a schematic diagram of a digital rights management file format in accordance with an embodiment of the present invention.

FIG. 7 shows a schematic representation of a way in which an asset or media package 3100 is associated with signature data 3200 that is used to encrypt the package 3100. Typically, the signature data comprises data relating to the usage rights of the package together with a symmetric key that is used to encrypt the package 3100 and can be used to ensure the media package has not been tampered with. However, it will be appreciated that an asymmetric key could be used to encrypt the package 3100. The signature data 3200 may be a stand-alone file or may be appended to the end of the package as shown in FIG. 7. Alternatively, the signature data 3200 could be appended to the front of the package 3100, placed within the package 3100 or distributed throughout the package 3100. Optionally, other signatures (e.g. 3210, 3220) having different properties and attributes may be associated with the same package 3100. The attributes and properties that the signature data may have will be described in more detail later.

In an embodiment of the present invention, the usage rights contained within the signature 3200 lock the use of the package so that the package may only be used/accessed on an entertainment device (PSP, PS3 or any other suitable entertainment device) having a particular unique hardware identification (HWID). In this case, the HWID of the particular entertainment device with which the package 3100 is associated is stored as a hash value within the signature data 3200 and the symmetric key used by the entertainment device (of which the cell processor, for example, may act as an encryptor and/or decryptor) to decrypt the package is generated in dependence upon the HWID. For example, the HWID may be stored on the HDD 400 and used by the copyright authorisation means when decrypting the package 3100. This reduces the likelihood that the signature 3200 of the package 3100 will be cracked, as the signature data 3200 does not contain all the information needed to decrypt the package 3100. The hashing of the HWID means that the HWID of the device associated with the package is not recoverable from the signature.

The processor 100 is operable to determine whether the package 3100 is encrypted or is locked to a particular entertainment device. If the package 3100 is not encrypted or is not hardware locked to an entertainment device, then a user is free to use or access the package 3100 without restriction. However, if the package 3100 is encrypted or is hardware locked, the processor 100 is operable to detect the usage rights of the package 3100 and decrypt the package 3100 in accordance with the signature data 3200 as will be described later below.

To reduce the likelihood that the signature data 3200 can be reverse engineered if the encryption method used is leaked to the public, parts of the signature data 3200 can be obscured by replacing some parts of the signature data 3200 (e.g. bits that are used, for example, as padding) with random data.

For example, where the first one hundred or so bits of the signature data 3200 comprise data that relates to the identity of the device with which the package is associated (product code), these bits could be encrypted using a cryptographic hash function such as a secure hashing algorithm (SHA) so as to obscure the product code. Typically, SHA-1 (Federal Information Processing Standards Publication 180-2, 1 Aug. 2002-http://csrc.nist.gov/publications/fips/fips180-2/fips180-2withchangenotice.pdf) is used as the hashing function although it will be appreciated that any suitable hash function may be used. Additionally, where the hash function produces a result that is longer than the space assigned to that data within the signature data 3200, a Boolean operation may be performed on sets of bytes of the resultant hash function so as to reduce the number of bytes required to store the obscured data.

For example, if the SHA-1 hashing function is used, the output of the hash function comprises 160 bits (20 bytes, where 1 byte=8 bits). Therefore, in the case where the space allocated to the product code within the signature data 3200 is 16 bytes and the hash function produces twenty bytes, the output of the hash function can be broken down into four sets of five bytes. Then, for each set of five bytes, a Boolean logical operation such as XOR may be performed between the first four bytes and the fifth byte of the group thus reducing the total number of bytes. When concatenated together, the total number of bytes is then sixteen rather than twenty. The resultant reduced size hash data is used in place of the product code within the signature data 3200. Of course it will be appreciated that any suitable logical operation may be used to reduce the number of bytes of the resultant product of the hash function.

The signature data 3200 may comprise application data which relates to the content of the package 3100. Typically, the application data comprises any type of data that can be used by the application. Advantageously, as the signature data 3200 comprises the application data, the application data can be accessed without the contents of the package 3100 being decrypted. Furthermore, where the signature data comprises application data, this may be encrypted using a symmetric key cipher such as Tiny Encryption Algorithm (TEA) ("*TEA, a tiny encryption algorithm*". David J. Wheeler and Roger M. Needham. Fast Software Encryption Second International Workshop ed. Bart Preneel, volume 1008 of Lecture Notes in Computer Science, pages 363-366, Leuven, Belgium, 1446 Dec. 1994), Extended Tiny Encryption Algorithm (XTEA) ("*Tea extensions*." Roger M. Needham and David J. Wheeler. Technical report, Computer Laboratory, University of Cambridge, October 1997 http://www.cix.co.uk/~klockstone/xtea.pdf), or the Blowfish encryption algorithm ("*Description of a New Variable-Length Key, 64-bit Block Cipher (Blowfish)*" Bruce Schreier, Fast Software Encryption 1993: 191-204—http://www.schneier.com/paper-blowfish-fse-.html) although it will be appreciated that any suitable symmetric key cipher may be used. Typically, where TEA or XTEA is used, the number of rounds (n) used to encrypt the data is $8 \leq n \leq 255$. Optionally, the application data is encrypted using the product code as the symmetric key of the encryption algorithm.

As well as or instead of the hardware ID, the signature data may comprise usage rights that relate to any or all of: an account ID that relates to a particular user of the entertainment device; a time reference that is used to determine a time period during which the package 3100 may be decrypted by the copyright determining means; and an expiry date that is used to represent a date after access to the content of the package 3100 is denied. Therefore, the signature data 3200 may comprise any or all of: the hardware ID; the account ID; the time reference; and the expiry date.

In this case, the usage rights of the signature data 3200 are combined to form a Boolean equation that can be evaluated by the copyright determining means to determine whether the usage rights associated with a particular entertainment apparatus of a user fulfil the criteria needed to decrypt the package 3100. Typically, this is represented within the signature data 3200 as a binary tree structure where terminal nodes relate to the usage rights of the package and non-terminal nodes relate to Boolean operations as will be described later. Therefore, in order for the copyright determining means to be able to decrypt the package 3100, the Boolean equation must be satisfied.

The signature data may be encrypted using an asymmetric cipher such as the Rivest, Shamir, & Adleman (RSA) algorithm although it will be appreciated that any suitable asymmetric or symmetric cipher may be used. By encrypting the signature data, the likelihood that the symmetric key can be deduced from the signature data can be reduced. Typically, the signature data 3200 is encrypted using a public key and subsequently decrypted by the processor 100 using a private key associated with the public key. In a preferred embodiment of the invention, the signature data 3200 is encrypted and decrypted according to the RSA algorithm with a 2048 bit key pair although it will be appreciated that any appropriate key pair length could be used.

The decryption of the signature data 3200 and its associated package 3100 will now be described with reference to FIG. 8.

Figure 8:
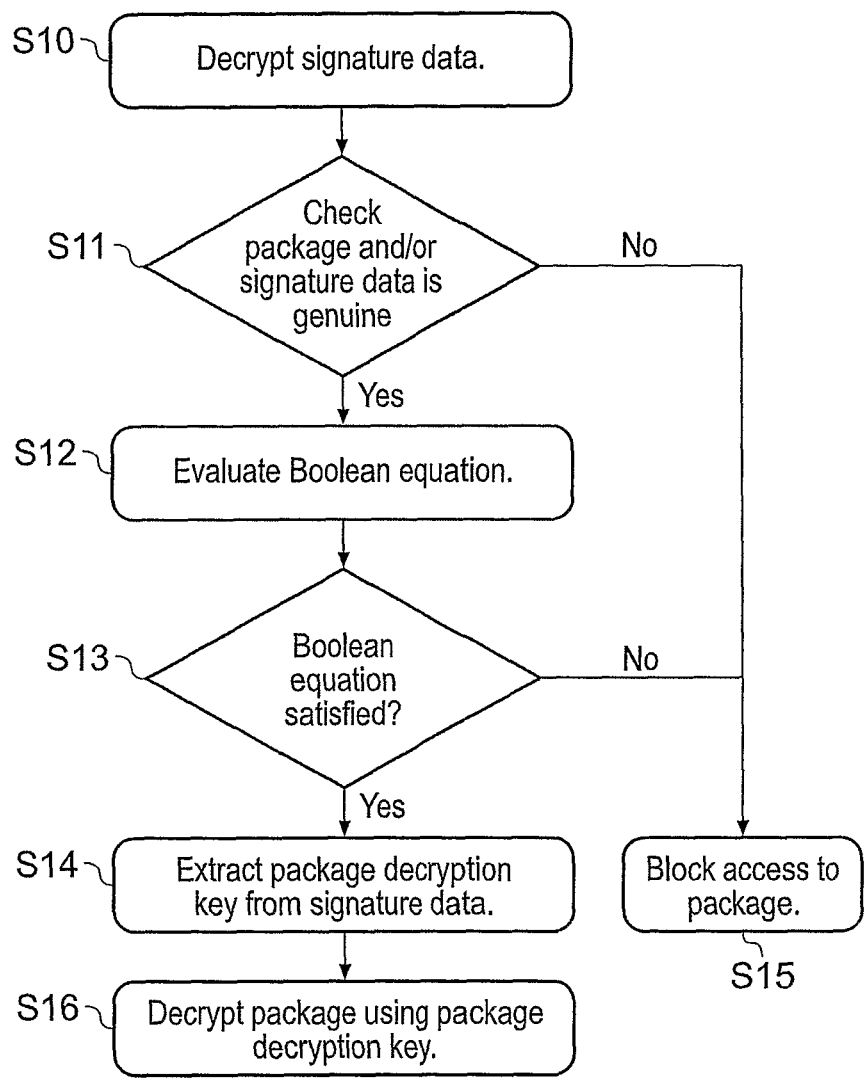
FIG. 8 is a flow diagram of a decryption method in accordance with an embodiment of the present invention.

FIG. 8 shows a flow chart of a method of decrypting the signature data 3200 together with its associated package 3100 in accordance with an embodiment of the present invention. Here the decryption may be performed by the cell processor 100 of the entertainment device 10 or the CPU 2101 of the entertainment device 2100 or 2200. However, in the following description of FIG. 8, it will be assumed that the cell processor 100 of the entertainment device 10 carries out the decryption.

At a first step s10, the processor 100 decrypts the signature data 3200 using known decryption techniques. For example, where the signature data has been encrypted using a public key according to the RSA algorithm, the processor 100 is operable to decrypt the signature data 3200 using the private key associated with the public key.

At a step s11, the processor 100 performs a check to see if the package 3100 and/or the signature data 3200 is genuine.

In the case of the package 3100, the processor 100 generates a hash value from the encrypted package 3100. The processor 100 then compares this hash value with a package match key that was generated when the package 3100 was encrypted. The package match key is generated by creating a hash value from the encrypted package when the package 3100 is first encrypted. The package match key can be stored on the HDD 400 or stored on a digital rights management server (DRM server) and then downloaded to the entertainment device when access to the package is requested by the entertainment device.

A similar method is used to determine whether the signature data 3200 is genuine and has not been tampered with. Here, in a similar process to that used to generate the package match key, a signature match key is generated when the signature data is first created and the signature match key is stored on the HDD 400 or on the DRM server. Optionally, the check is performed only on the package 3100. Alternatively, the check is only performed on the signature data or the check is performed on both the package 3100 and the signature data 3200.

It will be appreciated that the package match key and the signature match key could be generated from the unencrypted package 3100 and the unencrypted signature data 3200 respectively. In this case, the processor is operable to decrypt the package and/or the signature before the hash values are generated and the hash value comparison is carried out.

If the processor determines that the hash value generated from the package 3100 does not match the package match key, or that the hash value generated from the signature data 3200 does not match the signature match key, then at a step s15, access to the package is blocked, as the mismatch between the hash value and the match key indicates that the package 3100 and/or the signature data 3200 is likely to have been tampered with.

If however, the processor 100 detects that the hash value matches the match key, then, at a step s12, the processor 100 evaluates the usage rights contained within the signature data 3200 using a Boolean equation R to determine whether the package may be used/accessed on that entertainment device 10. For example, the Boolean equation R may be defined in terms of the usage rights as defined above such that:

$$R = R1 \text{ OR } R2$$

where $$R1 = (A == a) \text{ AND } (H == h)$$

and $$R2 = (A == a) \text{ AND } (H == h) \text{ AND } (t \geq T) \text{ AND } (t \leq T + d)$$

Here, AND and OR are Boolean logical operators well known in the art and == is an operator that returns true if the two operands are equal and false if they are different, and:

H is a representation of the hardware ID of the device on which the package 3100 is intended to be used and may be a hashed value of the hardware ID or some other representation of the hardware ID;

h is a representation of the hardware ID of the device evaluating the usage rights and may be a hashed value of the hardware ID of the device evaluating the usage rights or some other representation of that hardware ID;

A is a representation of the account ID of a user who owns the package 3100 and may be a hashed value of the account ID of the user who owns the package or some other representation of the account ID;

a is a representation of the account ID of a user who is logged onto the device evaluating the usage rights and may be a hashed value of their account ID or some other representation of their account ID;

T is a reference date (relevant to usage allowed over a limited time period—see below);

t is the time at which the usage rights are evaluated; and d is a constant indicative of the amount of time (after time t) for which access to the package 3100 may be granted.

In the example given above, the corresponding usage rights of the content could correspond to a situation where a user has purchased a media package for use on their own entertainment device without any time restrictions (as illustrated by R1 above) but if the user wants to use that media package on another entertainment device, then the use of that package may be limited to, for example, ten days (as illustrated by R2 above with T=the time at which the rights on the other device are to start and d=10 days). However, it will be appreciated that any suitable time period for the expiry of use of the package may be used and that d may take any value suitable to define the allowed time period. Additionally, it will be appreciated that the operands in the Boolean equation could be any or all of: binary values, integers, data strings and the like. Furthermore, it will also be appreciated that the operators in the Boolean equation could be any or all of: AND; OR; NOT; Equal to (==); add; subtract; multiply; divide; less than; more than; less than or equal to; more than or equal to; or any other suitable operator.

Figure 9:
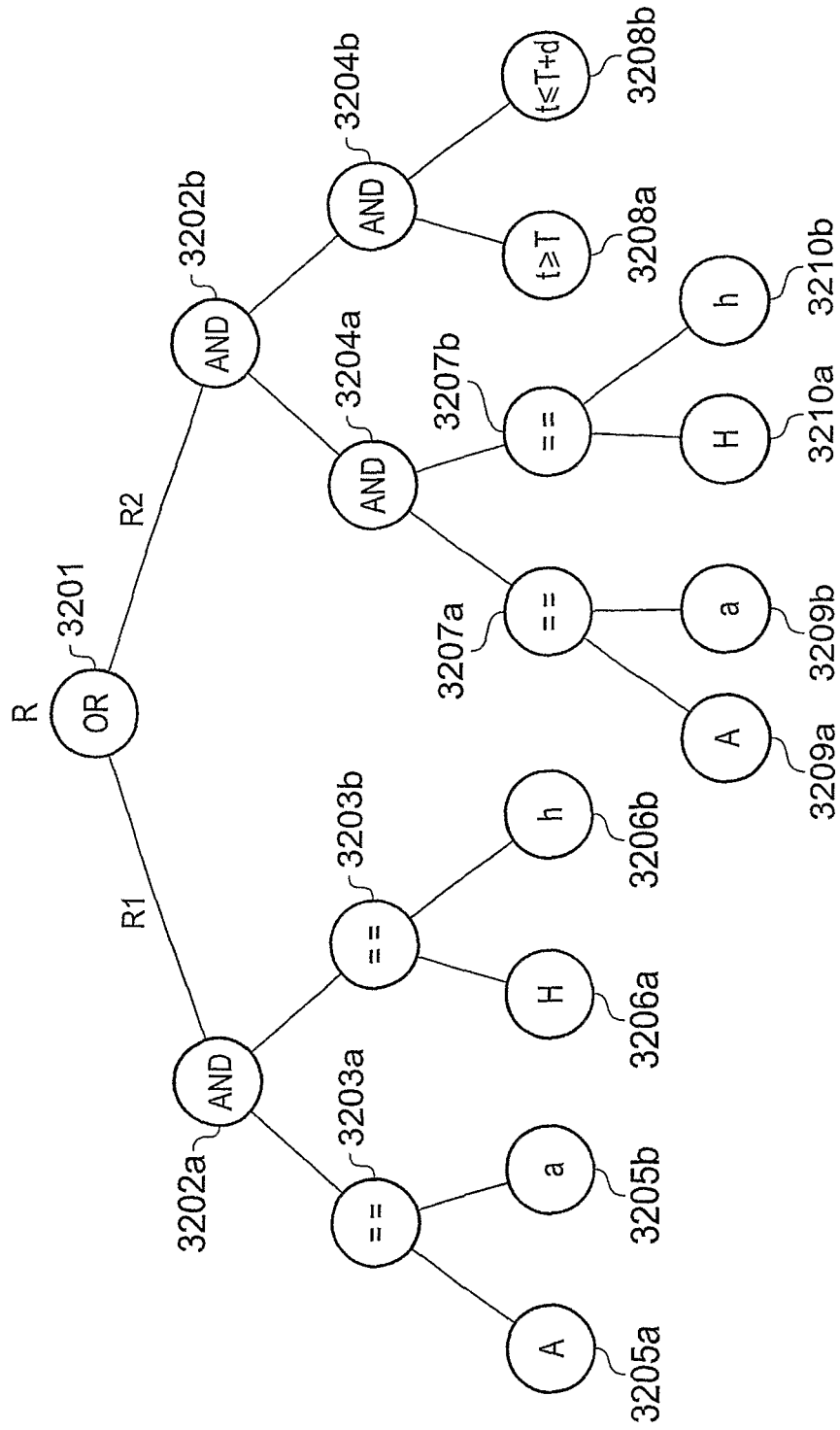
FIG. 9 is a explanatory schematic diagram of an example usage rights tree structure in accordance with an embodiment of the present invention.

Within the signature data 3200, the Boolean equation may be expressed as a tree structure as shown in FIG. 9. Typically, the tree structure is a binary tree structure, although it will be appreciated that other equations having different respective tree structures could be used and that the binary tree structure shown in FIG. 9 is included for explanatory purposes only and is not intended to be limiting. Here, the Boolean operators such as OR (3201), AND (3202a, 3202b, 3204a and 3204b), and == (3203a, 3203b, 3207a and 3207b) may be expressed as nodes of the tree and the usage rights such as H (3206a, 3210a), h (3206b, 3210b), A (3205a, 3209a), a (3205b, 3209b), t≥T (3208a) and t≤T+d (3208b) are expressed as terminal nodes of the tree structure. As can be seen from FIG. 9, branch R1 corresponds to the situation where the user who has purchased the media package 3100 is free to use that media package 3100 on their own machine without any restrictions, whilst branch R2 represents the situation where the user who owns the media package 3100 uses that media package 3100 on another entertainment device and the usage of that package 3100 is restricted to a time period such as 10 days as described above.

Returning now to FIG. 8, at a step s13, the processor 100 determines whether the Boolean equation is satisfied. If the equation returns 0, then, at the step s15, access to the package 3100 is blocked by the processor 100 and the content of the package 3100 cannot be used. If the equation returns 1, then, at a step s14, the processor is operable to extract the symmetric key associated with the package 3100. The processor 100 is then operable, at a step s16, to decrypt the media package 3100 using the symmetric key extracted at step s14. The Boolean equation may be evaluated each time access to the media package 3100 is requested by a user or continuously whilst the package is in use. Optionally, the Boolean equation is evaluated just once when access to the media package 3100 is first requested by a user. It will be appreciated that different equations and/or result polarities could be used, for example resulting in a "1" (or other value) if the access is to be denied, and vice versa.

The encryption and decryption of the media package and signature data will now be described in more detail with reference to FIGS. 10 and 11.

Figure 10:
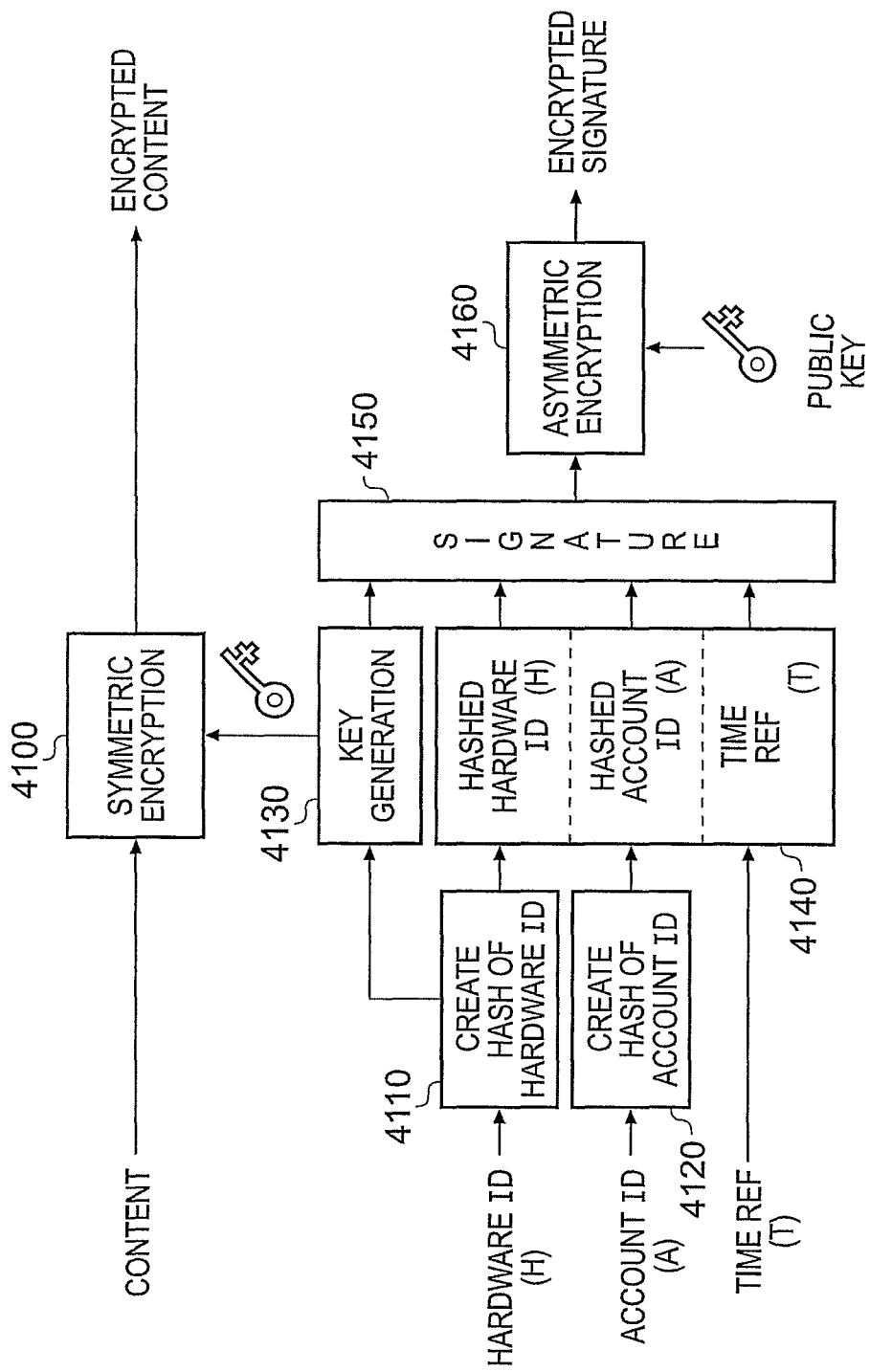
FIG. 10 is a schematic diagram of an encryption process in accordance with an embodiment of the present invention.

FIG. 10 schematically illustrates the encryption process of the content of the media package 3100 together with encryption of the signature data 3200 according to an embodiment of the invention. First, at a stage 4110 and a stage 4120, respective hash data relating to the hardware ID (H) of an entertainment device on which the media package 3100 is intended to be used and the account ID (A) of a user associated with that media package 3100 is generated according to a suitable hash function as described above. The hashed hardware ID (H) together with the hashed account ID (A) and the time reference (T,d) as described above are bundled together to form a usage rights bundle 4140.

At a stage 4130, the hardware ID (H) is used to create a symmetric key that will be used to encrypt the content of the media package 3100. As described above, this reduces the likelihood that the symmetric key can be obtained illegally from the signature data as a prior knowledge of the correct hardware ID (H) is needed to extract the symmetric key. Alternatively, the symmetric key may be generated in dependence upon the account ID (A), the time reference (T), the hash values of any of these values or created independently. Together with the usage rights bundle 4140, the symmetric key generated at the stage 4130 is then used to form a signature data block 4150.

At a stage 4100, the symmetric key that was generated at the key generation stage 4130 is used to symmetrically encrypt the content of the media package 3100 so as to form encrypted content. Optionally, the package match key may be generated from the encrypted or unencrypted package by generating a hash value of the unencrypted or encrypted package.

At a stage 4160, the signature data is asymmetrically encrypted using a public key that is uniquely associated with the media package 3100 so as to form encrypted signature data. The encrypted signature data is therefore associated with the encrypted content of the media package 3100. Optionally, before or after the stage 4160, the signature match key may be created by generating a hash value from either the signature data block 4150 or the encrypted signature data.

Figure 11:
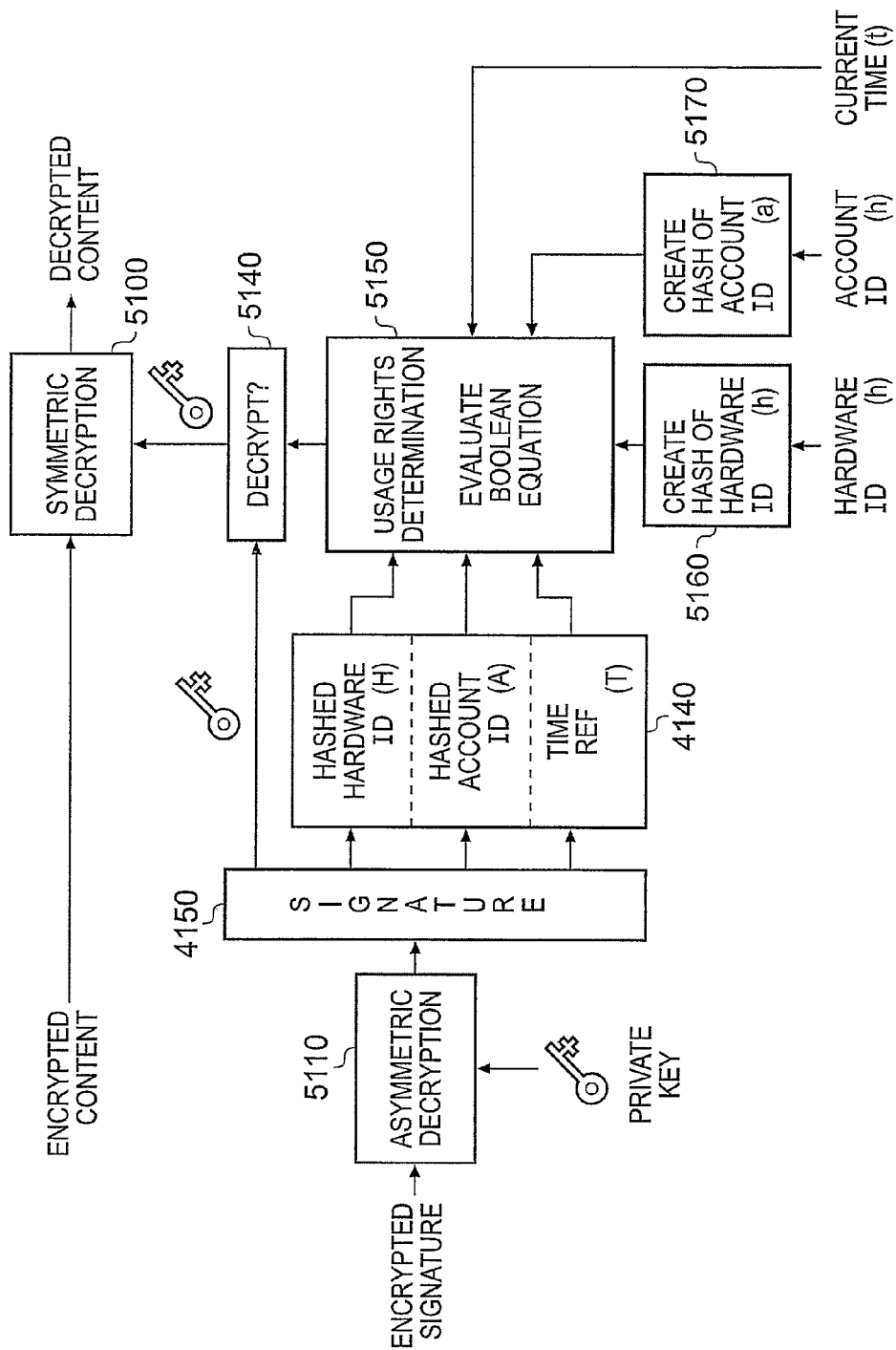
FIG. 11 is a schematic diagram of a decryption process in accordance with an embodiment of the present invention.

FIG. 11 schematically illustrates a decryption process of the encrypted content together with the encrypted signature data encrypted according to the embodiment shown in FIG. 10.

At a first stage 5110, the package and/or the signature data is checked to determine whether it is genuine as described above. If this checking is performed using the unencrypted package and/or the unencrypted signature data, these are decrypted according to the process described below before the check is carried out. The encrypted signature data is then asymmetrically decrypted using a private key so as to recover the unencrypted signature data block 4150. The usage rights bundle 4140 is then extracted from the signature data block 4150 and the usage rights contained within the bundle 4140 are passed to a usage rights determination stage 5150. Additionally, the symmetric key that relates to the encrypted content is passed to a decryption determination stage 5140.

At a stage 5160 and a stage 5170, respective hash values of the hardware ID (h) of the entertainment device on which the usage rights are being evaluated and the account ID (a) of a user logged onto that entertainment device are generated using a suitable hash function as described above. The resultant hash values are passed to the usage rights determination stage 5150 together with data relating to the current time (t) (i.e. the time at which the usage rights are being evaluated).

The usage rights determination stage 5150 evaluates the Boolean equation as described above to determine whether the encrypted content should be decrypted. If the usage rights determination stage determines that the Boolean equation is satisfied, then it instructs the decryption determination stage 5140 to pass the symmetric key to the symmetric decryption stage 5100. The symmetric decryption stage 5100 then decrypts the encrypted content so as to produce decrypted content that may be accessed by the entertainment device. If, however, the usage rights determination stage 5150 determines that the Boolean equation is not satisfied the symmetric key is not passed by the decryption determination stage 5140 to the symmetric decryption stage 5100 and the encrypted content cannot be decrypted.

An embodiment of the present invention will now be described with reference to FIG. 12, in which digital media assets having associated signature data are shared between entertainment devices.

Figure 12:
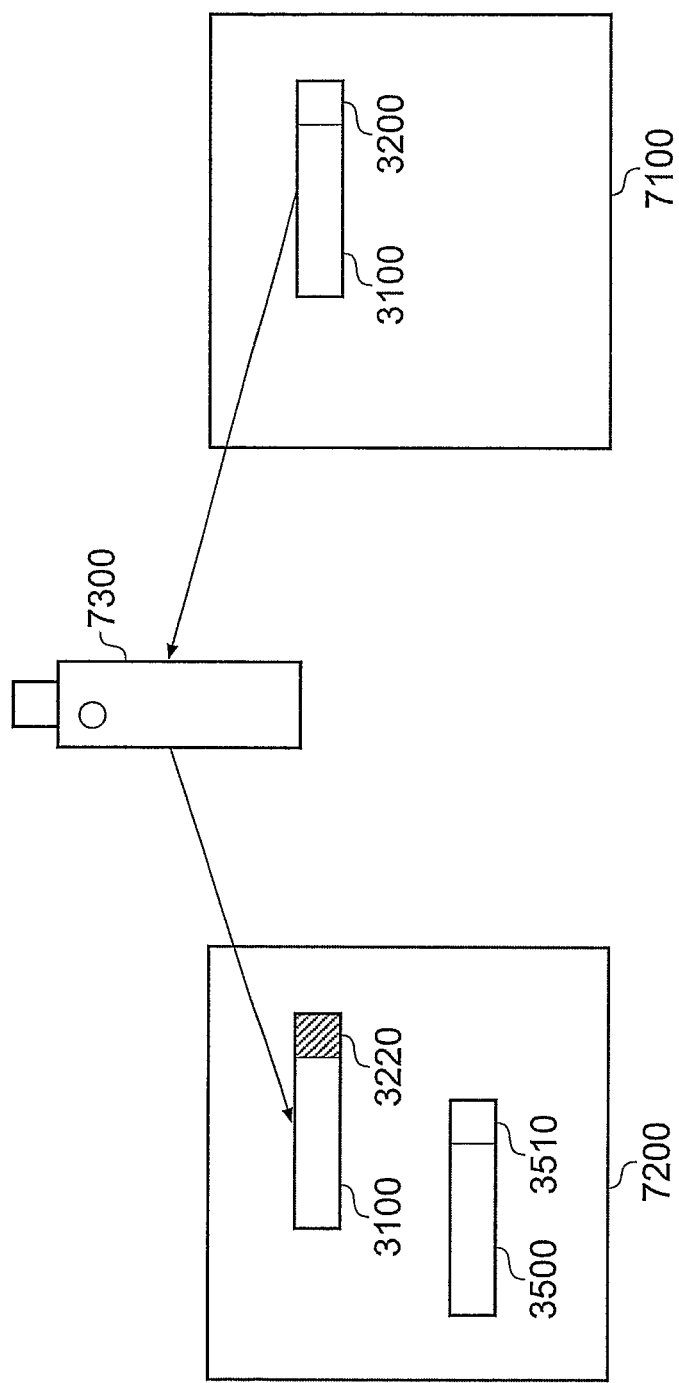
FIG. 12 is a schematic view of digital asset sharing in accordance with an embodiment of the present invention.

In the example shown in FIG. 12, a user of an entertainment device 7100 owns a media package 3100 having associated signature data 3200. In this case, the signature data 3200 comprises usage rights as described above that enable the first user to use that media package on their entertainment device 7100 without restriction (branch R1 above). For example, the media package could be the SingStar® game for the Sony PlayStation 3® entertainment device although it will be appreciated that the media package 3100 could be any other suitable game software, audio material, video material and the like and that the entertainment device could be a PSP® or any other entertainment device.

It will be appreciated however, that the first user may wish to visit a friend and play a game (e.g. SingStar®) on a friend's entertainment device 7200. To do so, they could transfer game data wirelessly, or they could load the encrypted media package 3100 (e.g. SingStar® game) from their entertainment device onto a Memory Stick® 7300 or other suitable memory card using the memory card reader 450 and take it with them to their friend's house. The media package can then be loaded onto the friends entertainment device 7200 and stored on the HDD 400. Therefore, the need to download the media package 3100 using the WiFi port 730 or Ethernet port 720 from, for example, a games server is removed (though that is still possible with the collaboration of the friends signature data and rights privileges).

However, the media package 3100 is still locked to the hardware ID of the user's entertainment device 7100 using the signature data 3200 as described above. Therefore, the user (owner) of the media package 3100 may log onto a digital rights management server from their friends entertainment device 7200 and download new signature data 3220 that will allow the media package to be decrypted on the friends entertainment device 7200. In this case, the use of the media package 3100 in the friends entertainment device 7200 can be limited to, for example, 10 days as described above (branch R2).

Furthermore, as the signature data 3220 that relates to the friends entertainment device 7200 is different to that which relates to the user's entertainment device 7100, the user may return home and continue to play the game on their device.

Typically, the media package 3100 is restricted to use only on two devices although it will be appreciated that this need not be the case; there may be no restriction placed on the number of devices or the maximum number of devices that can be authorised to decrypt the media package 3100 may be different. Additionally, the friends entertainment device 7200 may store at least another media package 3500 together with associated signature data 3510 that allows that media package 3500 to be used on that (friends) entertainment device 7200 without restriction.

The creation and downloading of signature data according to an embodiment of the invention will now be described in more detail with reference to FIGS. 13 and 14.

Figure 13:
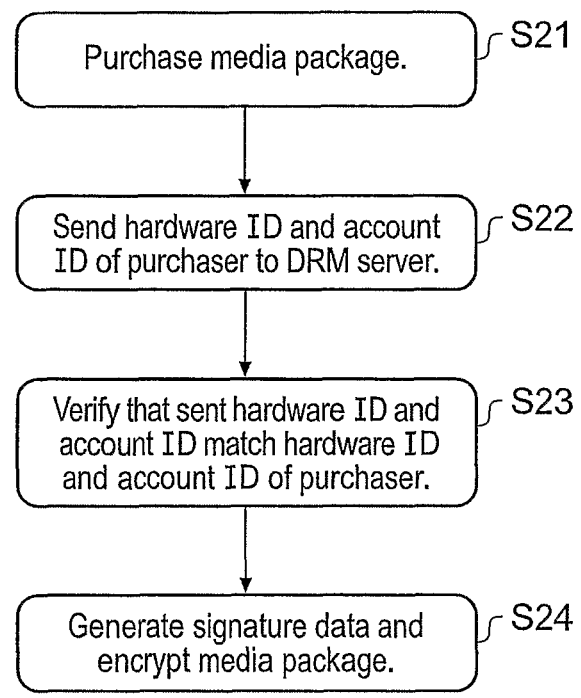
FIG. 13 is a flow diagram of a media package purchase method in accordance with an embodiment of the present invention.

FIG. 13 is a flowchart of a process by which signature data 3200 is generated for a media package 3100 when a user purchase that media package 3100.

At a step s21, the user (purchaser) purchases the media package 3100 from a media package provider. Here, the media package 3100 could be purchased on Blu-Ray® disc, CD-ROM, Memory Stick® or any other suitable storage medium. Alternatively, the user could download the media package 3100 over the internet from a media package server or the like.

Typically, as well as purchasing the media package 3100, the user is purchasing the right to use that package on their entertainment device 7100. Therefore, in order for appropriate signature data 3200 to be generated, the hardware ID of the user's entertainment device 7100 together with the account ID of the user is sent to a digital rights management server (DRM server) at a step s22.

At a step s23, the DRIVE server verifies that the hardware ID and the account ID match the hardware ID and account ID of the purchaser of the media package 3100. If they match then, at a step s24, appropriate signature data 3200 is generated as described above and the media package 3100 is encrypted accordingly so that use of the media package 3100 is restricted to the user's entertainment device (R1 above). Typically, the DRM server generates the signature data 3200 and the signature data 3200 is downloaded to the user's entertainment device. The processor 100 of the user's entertainment device 7100 then encrypts the media package 3100. Alternatively, once verified by the DRM server, the processor 100 of the user's entertainment device 7100 may generate the signature data 3200 as well as encrypting the media package 3100 thus reducing a processing load on the DRM server.

Figure 14:
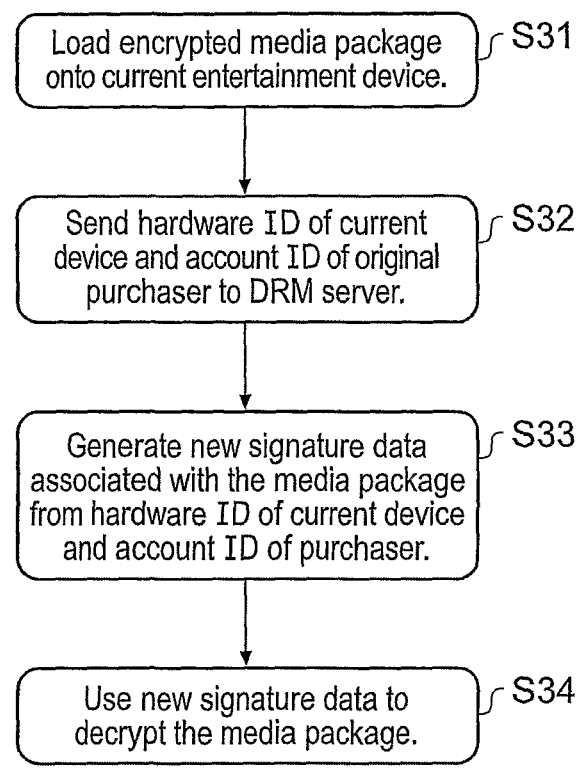
FIG. 14 is a flow diagram of signature data generation in accordance with an embodiment of the present invention.

FIG. 14 is a flowchart of a process used to generate the new signature data 3220 that allows the media package 3100 to be used on the friends entertainment device 7200.

As described above, at a step s31, the encrypted media package 3100 is loaded onto the current entertainment device 7200 from the Memory Stick® or other removable storage medium. Here, the current entertainment device is taken to be an entertainment device other than the entertainment device of the purchaser of the media package 3100 such as the friends entertainment device 7200.

So that new signature data can be generated that will allow the media package 3100 to be accessed on the friends entertainment device 7200, the hardware ID of the current entertainment device together with the account ID of the original purchaser of the media package 3100 is sent to the DRM server at a step s32. The account ID can either be sent to the DRM server from the current entertainment device 7200, in which case the original owner of the media package 3100 has to log in to that entertainment device 7200, or remotely from the user's (purchaser's) entertainment device 7100.

At a step s33, the new signature data 3220 associated with that media package 3100 is generated from the hardware ID of the current entertainment device and the account ID of the purchaser as described above and comprises the symmetric key necessary to decrypt the media package 3100. In this case, the new signature data 3220 comprises time reference data so as to limit the time period during which the media package 3100 can be used on the friends entertainment device 7200 as described above (R2 above). Typically, the DRM server generates the new signature data 3220. Alternatively, the current entertainment device 7200 may generate the new signature data 3220 if authorised to do so by the DRM server so as to reduce a processing load on the DRM server.

Additionally, the DRM server may comprise signature record means operable to store a signature record data that relates to the current number of valid signatures relevant to the package 3100. Alternatively, the signature record data comprises data that indicates how many signatures have previously been generated that relate to one particular package owned by a user. Optionally, the DRM server may store the hardware identification data of all the entertainment devices that have been associated with that package so as to determine whether the signature data can be generated. Therefore, once the new signature data 3220 has been generated, the signature record data is updated so as to determine whether further signatures can be generated.

Optionally, before the signature data is generated, a check is made to determine whether the generation of the new signature data 3220 is allowed in dependence upon the signature record data. If the generation of a new signature is not allowed (e.g. because there are currently several valid signatures relating to that package), then new signature data is not generated and the package 3100 is not accessible on another entertainment device. This check may be performed either by the DRM server or by the entertainment device in accordance with the signature record data.

Typically, the DRM server stores the signature record data (in encrypted or un-encrypted format) although the entertainment device may optionally store the signature record data in an encrypted format to prevent tampering. For example, in the situation where the package is restricted to use only on two different entertainment devices as described above, if the DRM server or the entertainment device detects that two signatures have previously been generated for that package 3100 and that these two signatures are currently valid (i.e. allow a user access/use of a package), generation of further signatures is blocked until the time period allowed by the new signature data for access/use of the package has expired. Finally, at a step s32, the symmetric key contained within the new signature data 3220 is used to decrypt the media package 3100 as described above. However, as the friend's entertainment device 7200 is not the same as the purchaser's entertainment device 7100, the duration of use of the media package 3100 is limited by the new signature data 3220 as described above.

It will be appreciated that the above described digital rights management scheme need not be limited to the situation where a purchaser wishes to use their purchased media package on another entertainment device. For example, the signature data could be used to allow users to hire a media package e.g. a movie and download it to the HDD 400 of their entertainment device. Once the time limit for use expires, the package could be automatically deleted from the HDD 400. Furthermore, the above described digital rights management scheme can be arranged to allow access to the package for a predetermined total time period. For example, a user could be allowed access to a package for a total of fifteen hours but those fifteen hours need not be used consecutively. In this case, the entertainment device stores time usage data that relates to the total number of hours that the package has been used/accessed and this data is used when evaluating the usage rights as described above.

Optionally, the digital rights management scheme described above could be used to limit the duration of access by allowing a user access to a package for a certain number of hours n each month or a predetermined number of hours for a predetermined number of months m (i.e. a time for a final termination of access can be included or not). Additionally, the user may extend the number of hours n of the number of months on payment of a fee to a digital rights management administrator. Alternatively, the number of hours n of months m that a user is allowed to use/access the package depends upon the size of the fee paid to the digital rights administrator. For example, the higher the fee, the greater the number of hours n that a user is allowed to use or access the package. However, it will be appreciated that any suitable fee or billing scheme may be used.

In the case described above, a suitable Boolean equation is $$R = R1 \text{ OR } R3$$

with $$R3 = (A == a) \text{ AND } (H == h) \text{ AND } (t \geq T) \text{ AND } (t \leq T+d) \text{ AND } (ut \leq UT)$$

and where:
R1, A, a, H, h, t, T, d, AND, OR and == are defined as given previously;
ut is the total time up to time t for which the package has been used/accessed; and
UT is a constant indicative of the total cumulative amount of time for which access to the package 3100 may be granted.

Typically, the value ut is generated by the DRM server in dependence upon a "package in use" data signal that sent to the server by the entertainment device. The package in use data signal indicates when the package is being used or accessed on the entertainment device so that the server can generate the value ut accordingly. When the usage rights are evaluated, the value of ut is sent from the server to the entertainment device so that the usage rights may be evaluated. Alternatively, the processor may generate the value ut and store this value as encrypted content on the HDD 400 or the Memory Stick® when each period of use of the package is terminated.

Where a condition relating to ut is included, it is in principle possible not to apply a condition relating to t, or as an option which avoids changing the equation, T could be set to some date a very long time in the future.

It will be appreciated that in embodiments of the present invention, elements of the entertainment method may be implemented in the entertainment device in any suitable manner. In particular, it may consist of an entertainment device 2100 adapted by software reconfiguration to share music assets, select audio segments in response to user input and received audio segment selection data, and implement copyright determination to determine how such shared and selected music assets should be stored. Additionally, it may consist of an entertainment device 100 adapted by software to carry out encryption and decryption of media packages in accordance with related signature data. Furthermore, it will be appreciated that where entertainment device is referred to above, this could be a PlayStation 3® entertainment device, a PlayStation® entertainment device or any other suitable entertainment device.

Although the signature data has been described with reference to game assets and in particular to decryption using the PS3, it will be appreciated that the signature data could be associated with the music assets used during collaborative jamming and that the encryption and decryption of the signature data together with the music assets could be performed by the PSP. Therefore, the signature data as described above can be used to perform the copyright authorisation of music assets during a collaborative jamming session.

Additionally, adapting existing parts of a conventional entertainment device as described above may comprise for example reprogramming of one or more processors therein. As such the required adaptation may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

Similarly, media data comprising or accompanied by authorisation limit values readable by a rights authorisation server of the entertainment device may also be stored on such data carriers.

The invention claimed is:
1. An entertainment device, comprising:
a communication arrangement operable to receive media data from a media data source;
and a storage arrangement comprising a processor coupled to memory, the storage arrangement being operable to store the received media data;
in which:
the communication arrangement is operable to receive, from a signature data source, signature data that relates to usage rights of the media data;
and the storage arrangement having the processor is operable to limit a duration of access to the media data which was received from the media data source in dependence upon the signature data received from the signature data source;
wherein the media data comprises encrypted media data, the signature data comprises encryption key data that relates to the encrypted media data, and the entertainment device comprises a decryptor operable to decrypt the encrypted media data in dependence upon the encryption key data; and
wherein the encryption key data is dependent upon time reference data that is used to determine a time period during which the media data is accessible, and upon an expiry date that is used to represent a date after which access to the media data is denied, and is also dependent on identity information including one or more of:
hardware identity data;
account identity data;
a hashed data value of the hardware identity data; and
a hashed data value of the account identity data;
in which the identity information, the time reference data and the expiry date are configured to be evaluated according to a Boolean expression to determine whether usage rights associated with the entertainment device fulfill the usage rights of the media data, so that when the Boolean expression is satisfied the entertainment device is configured to use the media data.
2. An entertainment device according to claim 1, in which the signature data comprises media data usage rights data that comprises any or all of:

the hardware identity data that relates to the hardware identity of an entertainment device associated with the media data;

the account identity data that relates to a user associated with the media data;

the time reference data that relates to the duration of access to the media data; and the expiry date.

3. An entertainment device according to claim 2, in which the hardware identity data and/or the account identity data comprise respective hashed data values.

4. An entertainment device according to claim 1, in which the encryption key data relates to a symmetric encryption process.

5. An entertainment device according to claim 2, comprising usage rights determination logic operable to detect the usage rights that relate to the media data and to determine, in dependence upon the media data usage rights data, whether a user has access to the media data in accordance with the Boolean expression, and in which:

the storage arrangement is operable to limit the duration of access to the media data in dependence upon the determination made by the usage rights determination logic.

6. An entertainment device according to claim 5, in which the usage rights determination logic is operable to determine, in accordance with the Boolean expression, whether a user has access to the media in dependence upon a respective comparison between the media data usage rights data and any or all of:

current hardware identity data that relates to the hardware identity of the entertainment device;

current account identity data that relates to a user associated with the entertainment device; and evaluation time reference data that relates to a time of access to the media data.

7. An entertainment device according to claim 6, in which the evaluation time reference data comprises data that relates to the current time of access to the media data and/or the total cumulative amount of time during which the media data has been accessed.

8. An entertainment device according to claim 6, in which, if the usage rights determination logic determines that the hardware identity data matches the current hardware identity data and the account identity data matches the current account identity data, then the storage arrangement is operable to not limit the duration of access to the media data.

9. An entertainment device according to claim 6, in which the storage arrangement is operable to limit the duration of access to the media data to a predetermined period in accordance with the time reference data.

10. An entertainment device according to claim 1, in which the media data source is another entertainment device.

11. An entertainment device according to claim 1, in which the media data source comprises a media data server.

12. An entertainment device according to claim 1 in which the media data source comprises a removable storage medium operable to store the media data.

13. An entertainment device according to claim 1, in which the signature data source comprises a digital rights management server.

14. An entertainment device, in which the signature data source comprises another entertainment device according to claim 1.

15. An entertainment device according to claim 1, in which the storage arrangement is operable to limit the duration of access to the media data in dependence upon a fee paid by a user to a digital rights administrator.

16. A tangible, non-transitory computer-readable data carrier storing computer readable instructions that, when executed by a computer, cause the computer to operate as an entertainment device comprising:

a communication arrangement operable to receive media data from a media data source;

and a storage arrangement comprising a processor coupled to memory, the storage arrangement being operable to store the received media data;

in which:

the communication arrangement is operable to receive, from a signature data source, signature data that relates to usage rights of the media data;

and the storage arrangement having the processor is operable to limit a duration of access to the media data which was received from the media data source in dependence upon the signature data received from the signature data source;

wherein the media data comprises encrypted media data, the signature data comprises encryption key data that relates to the encrypted media data, and the entertainment device comprises a decryptor operable to decrypt the encrypted media data in dependence upon the encryption key data; and wherein the encryption key data is dependent upon time reference data that is used to determine a time period during which the media data is accessible, and upon an expiry date that is used to represent a date after which access to the media data is denied, and is also dependent on identity information including one or more of:

hardware identity data;

account identity data;

a hashed data value of the hardware identity data; and a hashed data value of the account identity data;

in which the identity information, the time reference data and the expiry date are configured to be evaluated according to a Boolean expression to determine whether usage rights associated with the entertainment device fulfill the usage rights of the media data, so that when the Boolean expression is satisfied the entertainment device is configured to use the media data.

17. A method of data storage by an entertainment device, comprising the steps of:

establishing a communication link with a media data source;

receiving media data from the media data source;

receiving, from a signature data source, signature data that relates to usage rights of the media data;

storing received media data; and limiting, with a processor, a duration of access to the media data which was received from the media data source in dependence upon the signature data received from the signature data source;

wherein the media data comprises encrypted media data, the signature data comprises encryption key data that relates to the encrypted media data, and the entertainment device comprises a decryptor operable to decrypt the encrypted media data in dependence upon the encryption key data; and wherein the encryption key data is dependent upon time reference data that is used to determine a time period during which the media data is accessible, and upon an expiry date that is used to represent a date after which access to the media data is denied, and is also dependent on identity information including one or more of:

hardware identity data;
account identity data;
a hashed data value of the hardware identity data; and
a hashed data value of the account identity data;
in which the identity information, the time reference data and the expiry date are configured to be evaluated according to a Boolean expression to determine whether usage rights associated with the entertainment device fulfill the usage rights of the media data, so that when the Boolean expression is satisfied the entertainment device is configured to use the media data.

18. A tangible, non-transitory computer-readable data carrier storing computer readable instructions that, when executed by a computer, cause the computer to carry out a method of data storage, the method comprising:
establishing a communication link with a media data source;
receiving media data from the media data source;
receiving, from a signature data source, signature data that relates to usage rights of the media data;
storing received media data; and
limiting, with a processor, a duration of access to the media data which was received from the media data source in dependence upon the signature data received from the signature data source;
wherein the media data comprises encrypted media data, the signature data comprises encryption key data that relates to the encrypted media data, and the entertainment device comprises a decryptor operable to decrypt the encrypted media data in dependence upon the encryption key data; and
wherein the encryption key data is dependent upon time reference data that is used to determine a time period during which the media data is accessible, and upon an expiry date that is used to represent a date after which access to the media data is denied, and is also dependent on identity information including one or more of:
hardware identity data;
account identity data;
a hashed data value of the hardware identity data; and
a hashed data value of the account identity data;
in which the identity information, the time reference data and the expiry date are configured to be evaluated according to a Boolean expression to determine whether usage rights associated with the entertainment device fulfill the usage rights of the media data, so that when the Boolean expression is satisfied the entertainment device is configured to use the media data.

* * * * *